US011516778B2

(12) United States Patent
Mukherjee et al.

(10) Patent No.: US 11,516,778 B2
(45) Date of Patent: Nov. 29, 2022

(54) UPLINK CANCELLATION INDICATION

(71) Applicant: Charter Communications Operating, LLC, St. Louis, MO (US)

(72) Inventors: Amitav Mukherjee, Elk Grove, CA (US); Maulik Vaidya, Escondido, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/151,089

(22) Filed: Jan. 15, 2021

(65) Prior Publication Data
US 2022/0232545 A1 Jul. 21, 2022

(51) Int. Cl.
*H04W 72/04* (2009.01)
*H04W 74/08* (2009.01)
*H04W 72/12* (2009.01)

(52) U.S. Cl.
CPC ... *H04W 72/0406* (2013.01); *H04W 72/1268* (2013.01); *H04W 74/085* (2013.01); *H04W 74/0808* (2013.01); *H04W 72/044* (2013.01)

(58) Field of Classification Search
CPC ......... H04W 72/0406; H04W 72/1268; H04W 74/0808; H04W 74/085; H04W 72/044
USPC ....................................................... 370/330
See application file for complete search history.

(56) References Cited

U.S. PATENT DOCUMENTS

| 10,986,695 | B1* | 4/2021 | Babaei | H04W 72/0453 |
| 2020/0260391 | A1* | 8/2020 | Zhou | H04W 52/146 |
| 2021/0218503 | A1* | 7/2021 | Babaei | H04L 1/1812 |
| 2021/0259010 | A1* | 8/2021 | Yang | H04W 72/1284 |
| 2021/0307002 | A1* | 9/2021 | Akkarakaran | H04J 11/0033 |
| 2021/0329679 | A1* | 10/2021 | Hosseini | H04L 5/0096 |
| 2021/0360686 | A1* | 11/2021 | Taherzadeh Boroujeni | H04W 72/14 |

OTHER PUBLICATIONS

3GPP TSG RAN Meeting #86, RP-193233, titled "Enhanced Industrial Internet of Things (IoT) and URLLC support" Dec. 9-12, 2019, 5 Pages.
3GPP TS 38.211 V16.0.0, 3rd Generation Partnership Project; Technical Specification Group Radio Access Network; NR; Physical channels and modulation (Release 16), Dec. 2019, 129 Pages.
(Continued)

*Primary Examiner* — Kwang B Yao
*Assistant Examiner* — Syed M Bokhari
(74) *Attorney, Agent, or Firm* — Straub & Straub; Michael P. Straub; Stephen T. Straub

(57) ABSTRACT

A user equipment has been allocated uplink resources, e.g. interlaced uplink channel resources, e.g. interlaced physical uplink shared channel (PUSCH) resources, and non-interlaced uplink channel resources. The UE receives cancellation indication (CI) information which rescinds the allocation for a portion of the previous granted resources. CI is communicated using different formats for resources which are in blocks and resources which are interlaced. The CI for the interlaced resources uses a more efficient format with less overhead to communicate frequency information corresponding to the cancellation for the interlaced channel.

20 Claims, 24 Drawing Sheets

(56) References Cited

OTHER PUBLICATIONS

3GPP TS 38.212 V16.0.0, 3rd Generation Partnership Project; Technical Specification Group Radio Access Network; NR; Multiplexing and channel coding (Release 16), Dec. 2019, 145 Pages.
3GPP TS 38.213 V16.0.0, 3rd Generation Partnership Project; Technical Specification Group Radio Access Network; NR; Physical layer procedures for control (Release 16), Dec. 2019, 146 Pages.
3GPP TS 38.214 V16.0.0, 3rd Generation Partnership Project; Technical Specification Group Radio Access Network; NR; Physical layer procedures for data (Release 16), Dec. 2019, 147 Pages.
3GPP TS 38.211 V16.4.0, 3rd Generation Partnership Project; Technical Specification Group Radio Access Network; NR; Physical channels and modulation (Release 16), Dec. 2020, 133 Pages.
3GPP TS 38.212 V16.4.0, 3rd Generation Partnership Project;Technical Specification Group Radio Access Network; NR; Multiplexing and channel coding (Release 16), Dec. 2020, 152 Pages.
3GPP TS 38.213 V16.4.0, 3rd Generation Partnership Project; Technical Specification Group Radio Access Network; NR; Physical layer procedures for control (Release 16), 181 Pages, Dec. 2020.
3GPP TS 38.214 V16.4.0, 3rd Generation Partnership Project; Technical Specification Group Radio Access Network; NR; Physical layer procedures for data (Release 16), Dec. 2020, 169 Pages.

* cited by examiner

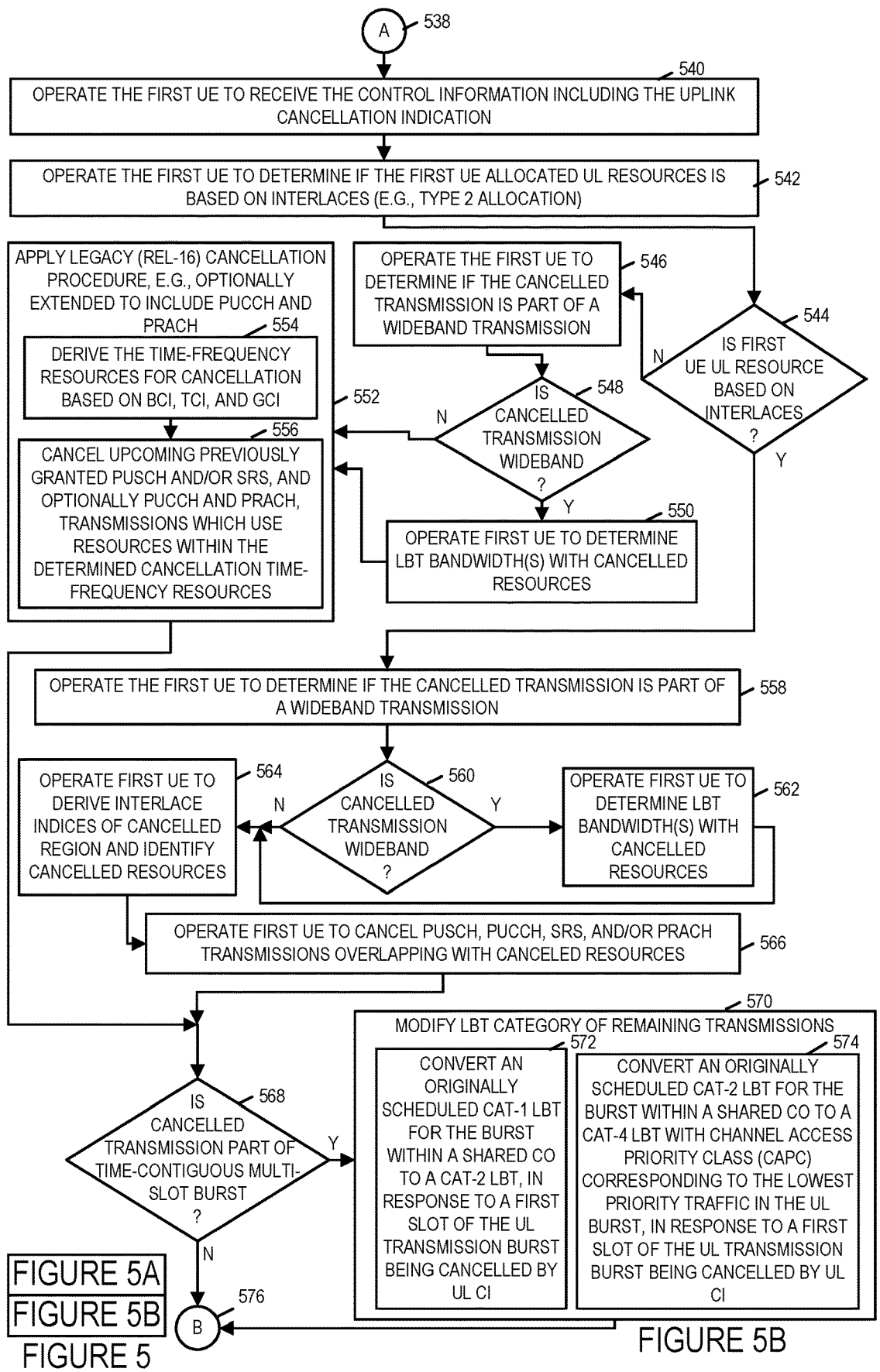

UPLINK CANCELLATION INDICATION

FIELD

The present invention relates to wireless communications systems, and more particularly to cancellation of selected previously allocated uplink communications resources and efficient communication of cancellation indication information from a base station to user equipment.

BACKGROUND

5G New Radio (NR) has several features designated for addressing Industrial Internet of Things (IIoT) use cases, such as factory automation and electrical power distribution. These use cases typically require ultra-reliable low latency communications (URLLC) with 99.999% or greater reliability.

NR supports overriding downlink (DL) or uplink (UL) resource grants in order to prioritize URLLC traffic. For example, in the Release-15 (Rel-15) a lower-priority user equipment (UE) can have a portion of its DL resource allocation pre-empted or reserved; the gNB can then dynamically reallocate these resources to other UEs. On the uplink (UL), a similar concept known as UL cancellation indication (CI) was introduced in Rel-16 NR for inter-UE prioritization.

For example, consider a UE with an upcoming, previously granted or configured Physical Uplink Shared Channel (PUSCH) or Sounding Reference Signal (SRS) transmission. A cancellation indication (CI) from the gNB will cancel said transmission(s) by the UE. An example illustration is shown in drawing 100 of FIG. 1. Drawing 100 of FIG. 1 includes gNB 102, user equipment 104, and frequency time plot 106. Frequency-time plot 106, which is used to represent downlink resources and signaling includes a vertical axis 110 representing frequency and a horizontal axis 112 representing time. Frequency-time plot 108, which is used to represent uplink resources and signaling includes a vertical axis 114 representing frequency and a horizontal axis 112 representing time. The gNB 102 generates and sends an UL grant on physical downlink control channel 1 (PDCCH 1) resources 118 granting physical uplink shared channel (PUSCH) resources 126 to UE 104. UE 104 receives the grant and plans a PUSCH transmission on resources 126. However, prior to the planned transmission, gNB 102 decides to cancel the granted PUSCH resources 126. The gNB 102 generates a cancellation indication (CI) and sends the generated CI on PDCCH 2 120 to UE 104. The CI communicates information which is used to derive (as indicated by arrow 124) a block frequency-time resources which are being cancelled, referred to as CI reference region 122. The CI reference region 122 includes the uplink resources 126 of the planned PUSCH TX 126. The CI reference region 123 may be, and sometime is, the same size as the PUSCH resources 126. The UE 114 receives the downlink control information including the CI communicated of PDCCH 2 120, recovers the communicated information, derives the CI reference region 122 based on the recovered information, determines that there is a planned PUSCH transmission within CI reference region 122, and cancels the planned PUSCH TX, as indicated by X 128.

In Rel-16, Physical Uplink Control Channel (PUCCH) or random access UL transmissions cannot be canceled by CI. Cross-carrier CI is supported.

The Rel-16 CI is transmitted by the gNB on Physical Downlink Control Channel (PDCCH) using Downlink Control Information (DCI) Format 2_4 (see 3GPP TS 38.212 V16.0.0 (December 2019) 3rd Generation Partnership Project; Technical Specification Group Radio Access Network; NR; Multiplexing and channel coding (Release 16)).

DCI format 2_4 is used for notifying the Physical Resource Blocks (PRB(s)) and OFDM symbol(s) where UE cancels the corresponding UL transmission from the UE according to 3GPP TS 38.213 V16.0.0 (December 2019) 3rd Generation Partnership Project; Technical Specification Group Radio Access Network; NR; Physical layer procedures for control (Release 16).

The following information is transmitted by means of the DCI format 2_4 with Cyclic Redundancy Check (CRC) scrambled by Cancellation Indication-Radio Network Temporary Identifier (CI-RNTI): Cancellation indication 1, Cancellation indication 2, . . . , Cancellation indication N.

The size of DCI format 2_4 is configurable by higher layers parameter dci-PayloadSize-forCI up to 12 bits, according to Clause 11.2A of (reference 5, 3GPP TS 38.213 V16.0.0 (December 2019) 3rd Generation Partnership Project; Technical Specification Group Radio Access Network; NR; Physical layer procedures for control (Release 16)). The number of bits for each cancellation indication is configurable by higher layer parameter CI-PayloadSize. For a UE, there is at most one cancellation indication for an UL carrier.

The UE is also configured by higher layers via Uplink-Cancellation IE for processing CI (see 3GPP TS 38.213 V16.0.0). The UE is provided a CI-RNTI for monitoring PDCCH candidates for a DCI format 2_4, and a set of serving cells that the CI corresponds to. For a given serving cell, the time and frequency regions for which the CI is applicable are indicated in DCI Format 2_4 and interpreted based on Radio Resource Control (RRC) configuration.

The time domain CI region: TCI is a number of symbols provided by timeDurationforCI, excluding symbols for reception of Synchronization Signals/Physical Broadcast Channel (SS/PBCH) blocks and DL symbols indicated by tdd-UL-DL-ConfigurationCommon. This value is either the same as the UL CI monitoring periodicity, or chosen from {2, 4, 7, 14} symbols for sub-slot CI monitoring periodicity. Multiple partitions of time-domain symbols can be configured within the TCI symbols, with up to GCI such partitions or groups. GC I is the time-domain granularity for CI within the time region and can be configured to 1, 2, 4, 7, 14 or 28.

For each partition [TCI/GCI] groups of symbols, frequency region for UL CI is derived as a set of BCI PRBs from frequencyRegionCI: A resource indication value (RIV) indication is provided (start PRB offset and number of contiguous PRBs) and configured by RRC within value range of (0 . . . 37949); the configuration is per serving cell. The reference point is derived based on the RRC parameter offsetToCarrier. The Subcarrier Spacing (SCS) for the DL Bandwidth Part (BWP) carrying UL CI is the reference SCS.

The UE determines the first symbol of the TCI symbols to be the first symbol that is after Tproc,2 from the end of a Physical Downlink Control Channel (PDCCH) reception where the UE detects the DCI format 2_4. Tproc,2 corresponds to the Physical Uplink Shared Channel (PUSCH) processing capability.

A UE that detects a DCI format 2_4 for a serving cell cancels PUSCH or SRS transmission if, respectively (see 3GPP TS 38.213 V16.0.0):

i) a group of symbols, from the TCI symbols, has a corresponding bit value of '1' in the DCI format 2_4 and includes a symbol of the (repetition of the) PUSCH transmission or of the SRS transmission, and ii) a group of PRBs, from the BCI PRBs, has a corresponding bit value of '1' in the DCI format 2_4 and includes a PRB of the (repetition of the) PUSCH transmission or of the SRS transmission.

In other words, the time-frequency resources for CI can be represented as a 2D bitmap over the time and frequency partitions within the reference regions.

FIG. 2 is a drawing 200 including a frequency-time plot with vertical axis 202 representing frequency and horizontal axis 204 representing time. The cancelled block of time-frequency uplink resources 206 corresponding to BCI physical resource blocks (PRBs) 210 and TCI symbols 208. In this example, the time domain granularity for TCI, GCI 211, is 4 indicating 4 partitions (partition 1 212, partition 2 214, partition 3 216 and partition 4 218) of the cancelled resources 206.

A new 3GPP Rel-17 WID on enhanced Industrial Internet of Things (IoT) and URLLC support (see RP-19323 "New WID on enhanced Industrial Internet of Things (IoT) and URLLC support", Dec. 9-12, 2019) includes an objective to identify potential enhancements to ensure Release 16 feature compatibility with unlicensed band URLLC/IIoT operation in controlled environment.

Rel-16 feature compatibility of IIoT needs enhancements when introduced in unlicensed spectrum in Rel-17, in order to comply with Rel-16 NR-Unlicensed (NR-U) design principles.

For example, PUSCH frequency-domain resource allocation in NR-U is in terms of interlaces (set of RBs spread across a BWP with multiple unoccupied RBs between each occupied RB in the interlace) for UEs configured with useInterlacePUSCH-Dedicated-r17, and not contiguous RBs as in IIoT. The resource block assignment information defined in (reference 5, TS 38.212) indicates to a UE a set of up to M interlace indices, and a set of up to N RB sets, where M and interlace indexing are defined in Clause 4.4.4.6 in 3GPP TS 38.211 V16.0.0 (December 2019) 3rd Generation Partnership Project; Technical Specification Group Radio Access Network; NR; Physical channels and modulation (Release 16). The UE shall determine the resource allocation in frequency domain as an intersection of the resource blocks of the indicates interlaces and the indicated set of RB sets and intra-cell guard bands defined in Clause 7 between the indicated RB sets, if any (see 3GPP TS 38.214 V16.0.0 (December 2019) 3rd Generation Partnership Project; Technical Specification Group Radio Access Network; NR; Physical layer procedures for data (Release 16)).

Intra-cell guard bands may be defined for wideband UL transmission across multiple Listen-Before-Talk (LBT) bandwidths. An RB set contains PRBs within an LBT bandwidth and does not include any inter or intra carrier guard PRBs.

The number of interlaces is M=10 for 15 kHz Subcarrier Spacing (SCS) and M=5 for 30 kHz Subcarrier Spacing (SCS), regardless of the bandwidth part (BWP) bandwidth. For 15 kHz SCS, the RIV interpretation if interlacing is defined in Sec. 6.1.2.2.3 of 3GPP TS 38.214 V16.0.0. For 30 kHz SCS, a 5-bit bitmap Resource Indication value (RIV) is used instead of RIV to indicate the allocated interlaces. Interlacing is also known as resource allocation type 2.

New Radio-Unlicensed Physical Uplink Control Channel (NR-U PUCCH) and Demodulation Reference Signals (DMRS) resources are also interlaced, with up to two interlaces for a single Physical Uplink Control Channel (PUCCH).

While uplink cancelation has been addressed to some extent there remains room for improvement with regard to the communication of uplink cancelation information and/or with regard to what resources can be canceled. Based on the above discussion there is a need for new methods and apparatus for UL CI. It would be desirable if at least some methods could be used for uplink cancelation when unlicensed spectrum is used.

SUMMARY

Methods and apparatus for efficiently communicating cancellation indication for uplink resources are described. Various described methods and apparatus are well suited for use in systems using unlicensed spectrum and requiring a high level of reliability. For some uplink channels such as the physical uplink shared channel (PUSCH) and the physical uplink control channel (PUCCH) resources to be allocated may be, and sometimes are interlaced in the frequency spectrum of the time-frequency structure and allocated based on frequency resource indices. Using a block cancellation approach to cancelling interlaced allocated frequency resources is inefficient in terms of the signaling overhead. In accordance with a feature of some embodiments, a new cancellation indication is defined and used for cancelling portions of interlaced PUSCH resources and/or interlaced PUCCH resources using a small size (less bits) resource indicator value for communicating the cancelled frequency information in the cancellation indicator to the UE, whose previous allocated resources are being cancelled.

In some embodiments in which a wideband bandwidth part (BWP) is used, a new indicator, e.g. up to 5 bits, is included in the cancellation indication, to indicate which of the portion of the wideband BWP are being cancelled, e.g., for an upcoming previously allocated PUSCH.

In some embodiments, in which a UE has been scheduled or configured to use a multi-slot PUSCH transmission over multiple consecutive transmission slots, a cancellation indication indicating cancellation of transmission in a slot PUSCH slot, e.g., a first slot, in said multiple consecutive transmission slots, triggers a UE to change a category of an LBT to be performed prior to transmission in a subsequent PUSCH slot, e.g. a second PUSCH slot, of said multiple consecutive transmission slots.

In various embodiments, the cancellation indicator is extended to include cancellation indication for the physical uplink control channel (PUCCH) and/or the physical random access channel (PRACH), e.g., with PUCCH and/or PRACH resources being selectively cancelled on a relatively low priority UE to allow for reduction in interference and/or collision avoidance for a relatively high priority UE.

An exemplary method of operating a first user equipment device, in accordance with some embodiments, comprises: receiving a first cancellation indication downlink control information (DCI) message indicating cancellation of at least a portion of a set of interlaced uplink resources which were previously allocated to the first UE; and operating the first UE to cease use of the uplink resources which the first cancellation indication DCI message indicates have been canceled.

While various features discussed in the summary are used in some embodiments it should be appreciated that not all features are required or necessary for all embodiments and the mention of features in the summary should in no way be interpreted as implying that the feature is necessary or critical for all embodiments.

Numerous aspects, features, and variations on the above described methods and apparatus are discussed in the detailed description which follows.

BRIEF DESCRIPTION OF THE FIGURES

FIG. 5B is a second part of an exemplary method of operating a communications system in accordance with an exemplary embodiment.

FIG. 5 comprises the combination of FIG. 5A and FIG. 5B.

DETAILED DESCRIPTION

Various exemplary embodiments are directed to solutions for uplink (UL) cancellation indication (CI) features and/or enhancements when operating in unlicensed spectrum.

Figure 1:
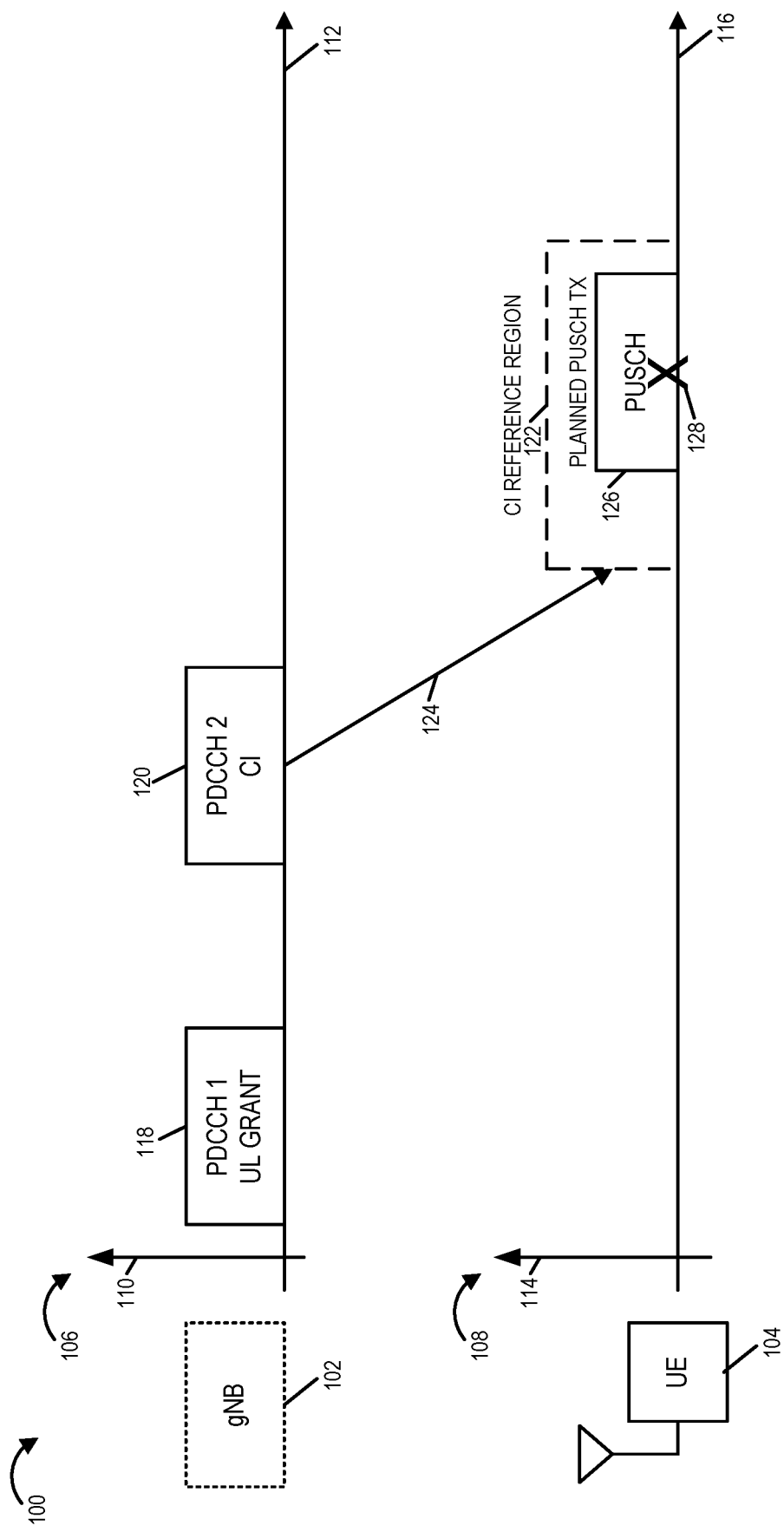
FIG. 1 illustrates an example in which a gNB grants a contiguous block of Physical Uplink Shared Channel (PUSCH) resources to a UE, and then sends a cancellation indication (CI), to the UE, said CI including information used to identify a cancellation region frequency-time resource block; the UE determines that the previous grant of the PUSCH resources to the UE has been revoked, and the UE refrains from using the previously granted PUSCH resources.
Figure 2:
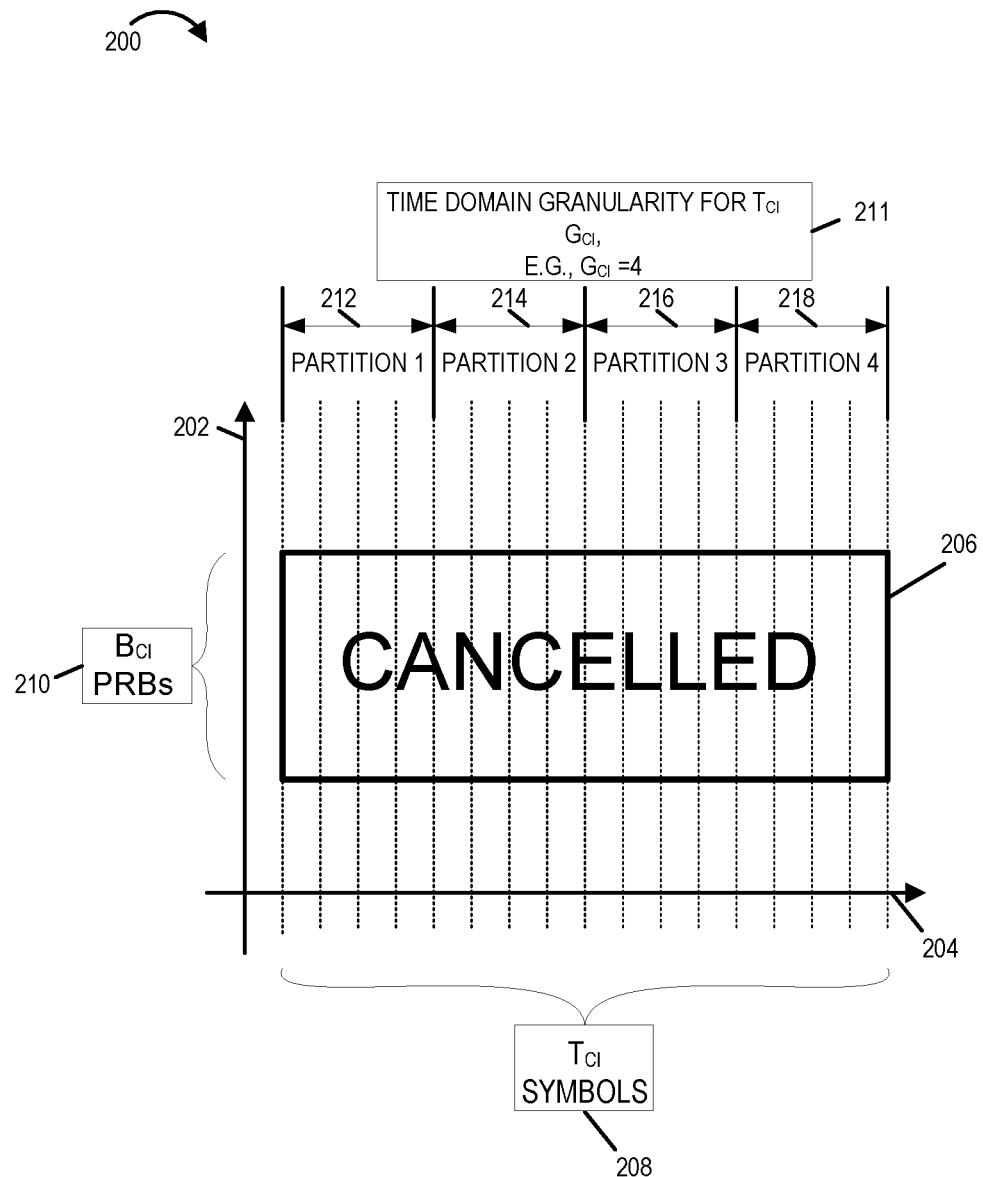
FIG. 2 illustrates an example of a cancelled contiguous block of uplink resources, corresponding to a downlink control information (DCI) message communicating a cancellation indication (CI) such as in FIG. 1, and further identifies parameters BCI, TCI, and GCI, used to define the cancellation region.
Figure 3:
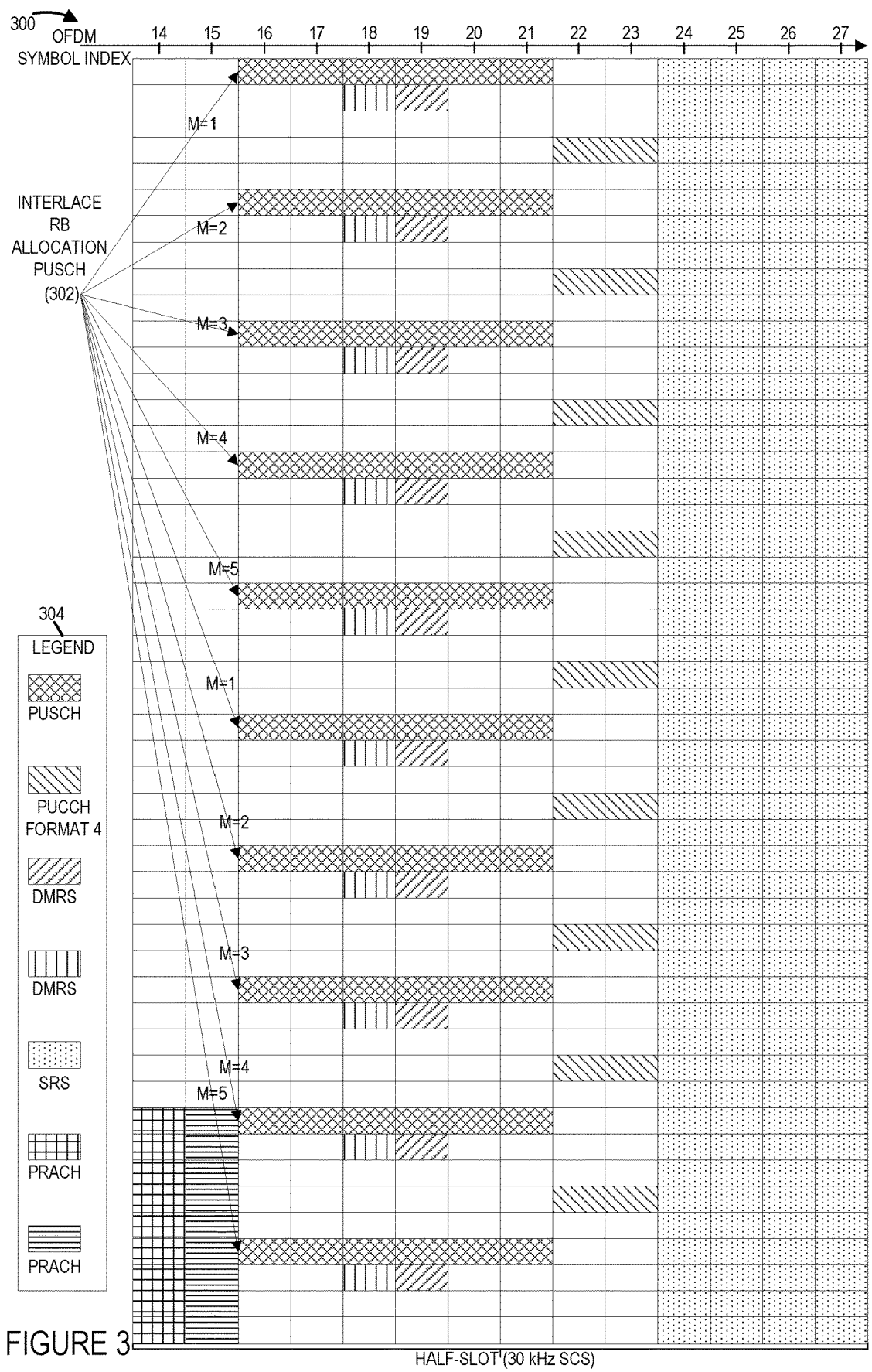
FIG. 3 illustrates a drawing of an exemplary half-slot in an exemplary uplink time-frequency structure for an example of new radio-unlicensed (NR-U) spectrum with interlacing, in which there is interlaced resource block allocation for the Physical Uplink Shared Channel (PUSCH) for at least some of the UEs in the system.

FIG. 3 is a drawing 300 of an example of illustrating new radio-unlicensed uplink (NR-U UL) interlacing. Drawing 300 illustrates a portion of NR-UL frequency-timing structure for a half-slot for 30 kHz Sub-Carrier Spacing (SCS). OFDM symbol index values (16, 17, . . . , 29) are indicated across the top. Legend 304 indicates: i) crosshatch shading indicates physical uplink shared channel (PUSCH) resources (interlaced), ii) dot shading indicates sounding reference signal (SRS) resources (non-interlaced), iii) vertical and horizontal shading indicates physical random access channel (PRACH) resources (non-interlaced), iv) diagonal line shading, with positive line slope, indicates demodulation reference signals (DMRS) resources (interlaced), v) diagonal line shading, with negative line slope, indicates PUCCH format 4 resources (interlaced), vi) horizontal line shading indicates physical random access channel (PRACH) resources (non-interlaced), and vi) vertical line shading indicates additional demodulation reference signals (DMRS) resources (interlaced). Set of arrows 302 points to interlaced resource blocks of PUSCH, which may be allocated to UEs. In this example the number of interlaces, with regard to the PUSCH, is M=5.

Three possible cases can be considered for implementing methods and apparatus in accordance with the present invention.

For Case I, both the low priority UEs (targets of cancellation indication (CI)) and high priority UEs, have type 2 resource allocation.

For Case II, the low-priority UEs have type 2 allocation, while high-priority UEs have type 0/1 allocation (no interlacing).

For Case III, the low-priority UEs have type 0/1 allocation, while high-priority UEs have type 2 allocation.

For Case IV, both the low-priority UEs (target of CI) and high priority UEs have type 0/1 allocation (no interlacing). This is the Rel-16 IIoT baseline and does not need further enhancements.

Various novel features of the invention, described below, are well suited for use in Cases I-III, e.g., cases in which a UE has type 2 allocation (using interlaces).

A first set of novel features includes enhancements to CI indication and interpretation in DCI Format 2_4 for unlicensed spectrum operation. The first enhancement is related to frequency-domain CI indication. The Rel-16 parameter frequencyRegionforCI indicates a Resource Indication Value (RIV) ranging between 0 and 37949 using 16 bits. However type 2 allocation does not need so many bits of interlace indication (for e.g., 15 kHz Subcarrier Spacing (SCS) has a RIV range of 0-63).

One alternative, used in some exemplary embodiments, in accordance with the present invention, is to define and use a new higher-layer parameter frequencyRegionforCI-interlaced-r17. In frequency range 1 (FR1), this new parameter, frequencyRegionforCI-interlaced-r17, can, and in some embodiments, does use 6 bits to indicate either a RIV range for 15 kHz SCS, or the 5 most significant bits (MSBs) of the 6 bits to indicate interlace indices for 30 kHz SCS as bitmap, depending upon the SCS of the active BWP.

Another alternative used in some embodiments, in accordance with the present invention, is for 6 or 5 MSBs of the existing frequencyRegionforCI parameter to be (repurposed) to be used to indicate the canceled interlace allocation as per the UL SCS, and the UEs disregard the remaining bits of the frequencyRegionforCI.

One consequence of reducing frequency-domain CI signaling overhead as described above (BCI is in terms of interlaces rather than PRBs) is that the time-domain scope (TCI) or granularity of CI (range of GCI values) may be enhanced while keeping the DCI payload size the same as Rel-16.

As a non-limiting example, UL CI signaled in a first channel occupancy (CO) may be applicable to a subsequent CO in time and is assumed to remain valid unless overridden by a new CI. In Rel-16, CO duration bit-field per serving cell is signaled in Group Common-Physical Downlink Control Channel (GC-PDCCH) in DCI Format 2_0.

Increasing the allowed range of GC1 is also useful, since high-priority PUSCH can be of any Start and Length Indicator Value (SLIV).

Furthermore, is a UE is configured with wideband PUSCH transmissions on a BWP wider than the LBT bandwidth (e.g., LBT BW of 20 MHz in 5 GHz0, then the UE CI may be indicated on a per-LBT bandwidth basis in the frequency domain.

In the case of DL-UL channel occupancy (CO) sharing, the occupied LBT bandwidths on the DL may be determined from GC-PDCCH on DCI Format 2_0, as per Rel-16. Additional new bits in DCI Format 2_4 (e.g., up to 5 bits) can also be defined/allocated per serving cell for dynamic indication of which LBT bandwidths within the BWP have UL cancellations. The corresponding UL CI is then mapped to the intersection of occupied LBT bandwidths and cancelled LBT bandwidth resources from DCI Formats 2_0 and 2_4, respectively as shown in FIG. 4 below.

If a UE is not configured to monitor DCI Format 2_0 or for UE-initiated COs: the new, dynamic indication of canceled LBT bandwidths resources in Format 2_4 alone is used to determine CI.

Advanced UEs capable of frequency-domain puncturing may still transmit UL on the intersection of the non-cancelled LBT bandwidth resources and RB sets outside of any intra-cell guard bands.

Figure 4:
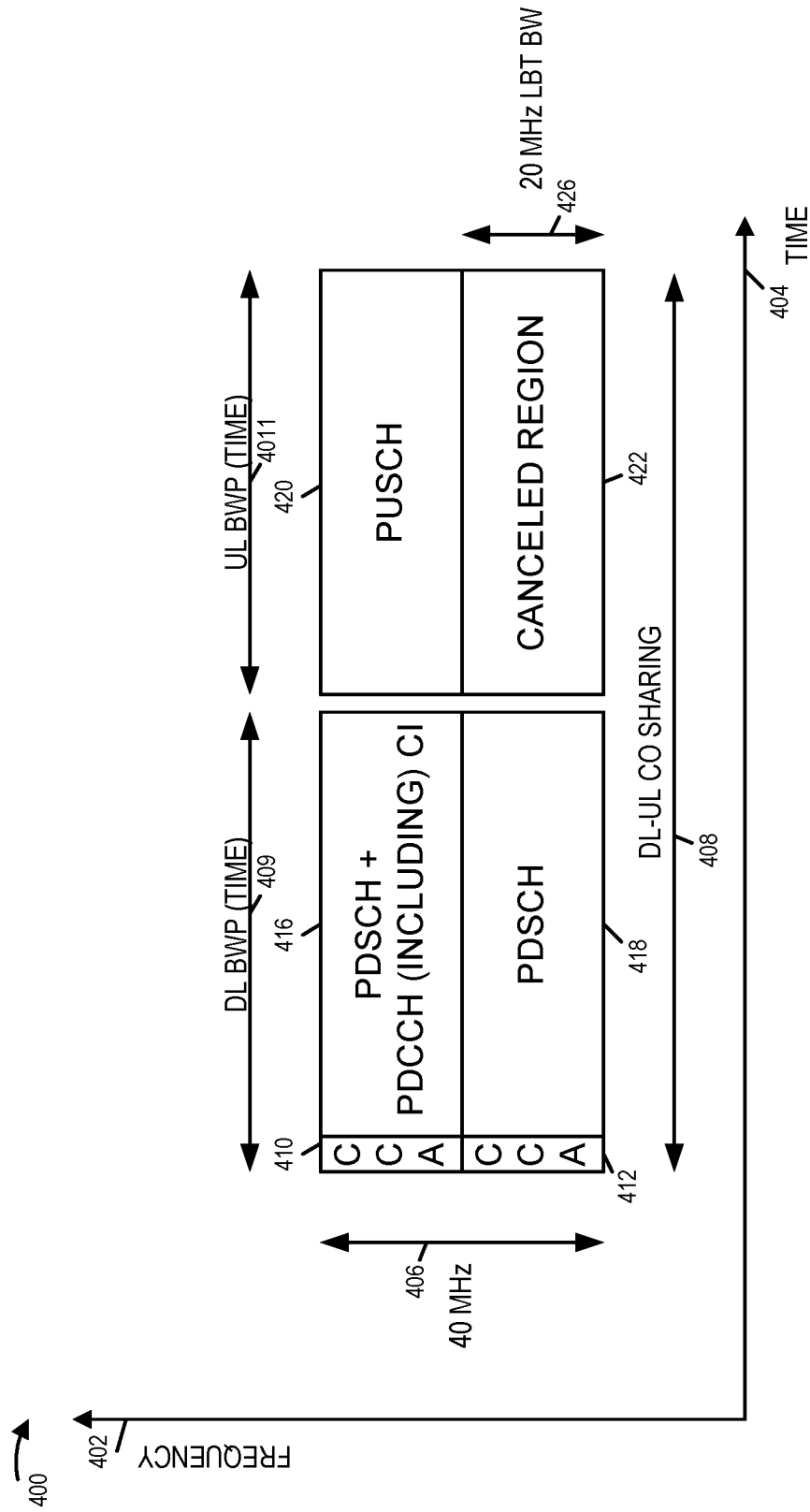
FIG. 4 is a drawing illustrating a frequency-time plot for an example of DL-UL channel occupancy sharing, in which a cancellation indication, cancels previously allocated PUSCH resources for a UE on a selected 20 MHz portion of a 40 MHz UL BWP.

FIG. 4 is a drawing 400 illustrating a plot of frequency on vertical axis 402 vs time on horizontal axis 404 for an example of DL-UL channel occupancy sharing 408. In this example the BWP of 40 MHz 406 includes two 20 MHz portions. During a first time interval 409 the 40 MHz BWP is used as a DL BWP; and during a second time interval 411, the 40 MHz BWP is used as an UL BWP.

Clear channel assessments (CCAs) 410, 412 are performed at the start of the DL BWP. Resources 416 of the DL BWP includes PDSCH resources+PDCCH resources used to communicate a Cancellation Indication (CI). Resources 418 of the DL BWP includes PDSCH resources. The CI signals that UL BWP portion resources 422 has been canceled with regard to being used as PUSCH for the UE to which the CI is directed. UL BWP resources 420 is still to used by the UE for PUSCH.

A second set of novel features addresses UL listen-before-talk (LBT) management for CI scenarios. If a UE has dynamically scheduled or configured grant PUSCH transmission over multiple consecutive slots, a LBT procedure (Cat-1 or no LBT, at-2 or one shot clear channel assessment (CCA), Cat-4 or random backoff) is required prior to the transmission of the first slot.

If the first slot(s) of the UL transmission burst are canceled by UL CI, then it, in some embodiments, for the remaining slots in the UL burst:
  i) an originally scheduled Cat-1 LBT for the burst within a shared CO is converted to a Cat-2 LBT. An previously indicated cyclic prefix (CP) extension still applies.
  ii) an originally scheduled Cat-2 LBT within a shared CO is converted to a Cat-4 LBT with channel access priority class (CAPC) corresponding to the lowest priority traffic in the UL burst. An previously indicated CP extension still applies.
  iii) no change is made in terms of LBT for a UE initiated CO, i.e. remains Cat-4.

If slots after the first slot are cancelled by CI, then a CAt-2 LBT is performed prior to transmitting any remaining slots in the burst.

For UE-initiated COs, any slots with cancelled PUSCH transmissions are excluded from the reference duration used for uplink contention window size adjustment.

If a dynamic or CG PUSCH is cancelled by CI, the UE treats it as an UL LBT failure from a MAC layer perspective in terms of MAC PDU handling. However, CI events are not counted as part of persistent UL LBT failure tracking.

A third set of novel features includes additional procedures associated with CI in unlicensed spectrum, in the form of dependent aspects of the first two embodiments.

In some embodiments, CI is allowed to also cancel Physical Uplink Control Channel (PUCCH) transmission unlike REl-16. This is particularly useful to avoid UL LBT blocking of higher priority UL PUSCH and cancel a previously triggered interlace-based PUCCH transmission of one-shot HARQ ACK feedback requested by the gNB using DCI Format 1_1.

In some embodiments, CI is allowed to also cancel Physical Random Access Channel (PRACH) transmission unlike REl-16. This is particularly useful to avoid UL LBT blocking of higher priority UL PUSCH by PRACH transmission that have the same starting symbol.

As a non-limiting example, CI cancels PRACH transmitted by RRC_CONNECTED UEs based on PDCCH order. The delay between PDCCH order and resulting PRACH transmission is at least 0.5 ms in FR1 (frequency range 1) and 0.25 ms in FR2 (frequency range 2), and during this delay higher-priority UEs may need UL PUSCH resources that overlap with PRACH resources of lower priority UEs.

Another example is cancellation of the interlaced PUSCH component of a 2-step RA msgA transmission that is either contention-free or contention-based.

For unlicensed frame based equipment (FBE) in addition to the Rel-16 exclusion of symbols for reception of SS/PBCH blocks and DL symbols indicated by tdd-UP-DL-ConfigurationCommon, the time frequency region indicated for CI is valid only within the gNB frame period and also excludes the gNB idle period.

Figure 5A:
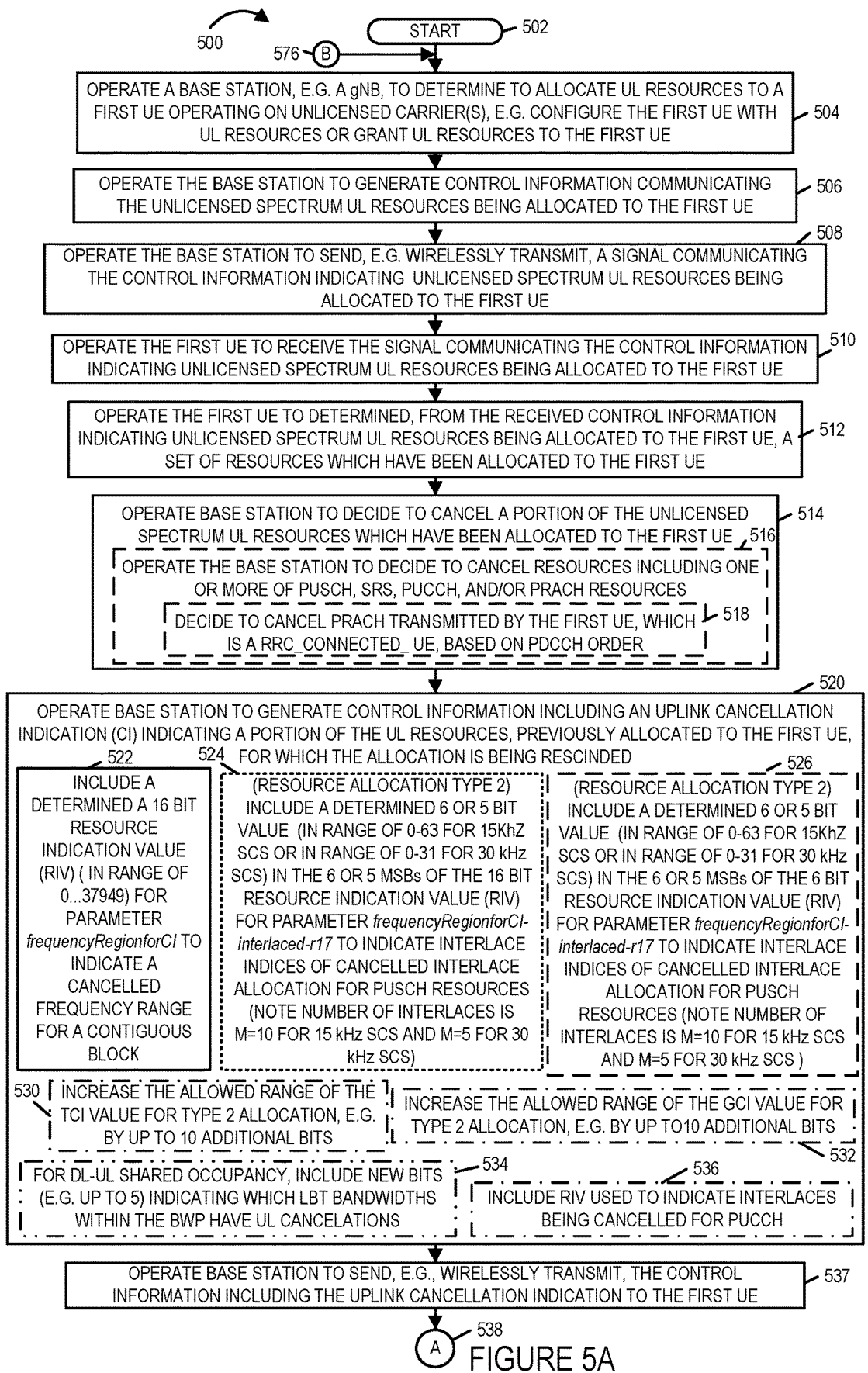
FIG. 5A is a first part of an exemplary method of operating a communications system in accordance with an exemplary embodiment.
Figure 16:
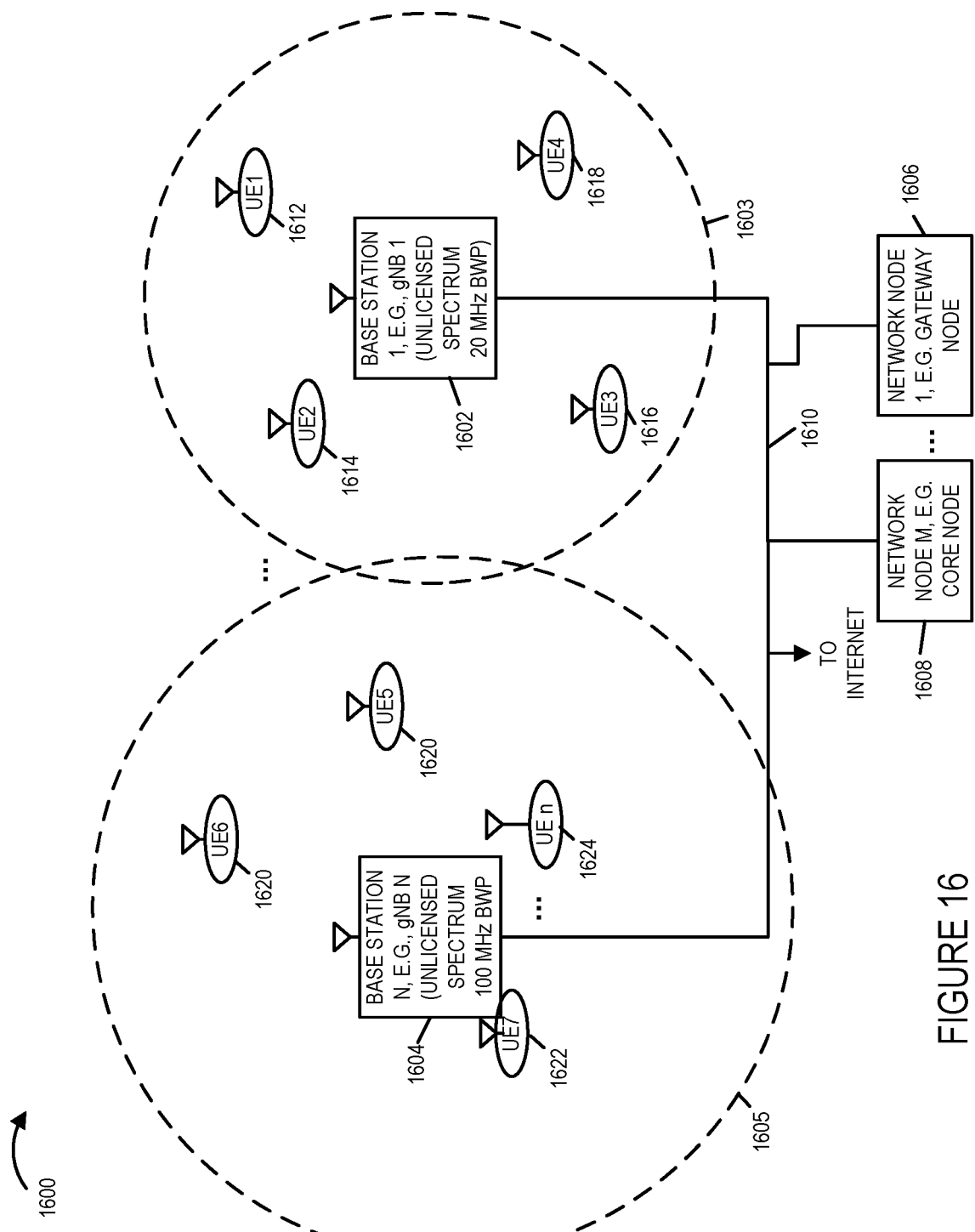
FIG. 16 is a flowchart of an exemplary communications system in accordance with an exemplary embodiment.

FIG. 5, comprising the combination of FIG. 5A and FIG. 5B, is a flowchart 500 of an exemplary method of operating a communications system, e.g., communications system 1600 of FIG. 16, in accordance with an exemplary embodiment. Operation starts in step 502 in which the communications system is powered on and initialized and proceeds to step 504.

In step 504 the base station, e.g. a gNB, determines to allocate uplink (UL) resources to a first UE operating on unlicensed carrier(s), e.g., to configure the first UE with UL resources or grant UL resources to the first UE. Operation proceeds from step 504 to step 506.

In step 506, the base station generates control information communicating the unlicensed spectrum UL resources being allocated to the first UE. Operation proceeds from step 506 to step 508.

In step 508 the base station sends, e.g., wireless transmits, a signal communicating the control information indicating unlicensed spectrum UL resources being allocated to the first UE. Operation proceeds from step 508 to step 510.

In step 510 the first UE receives the signal communicating the control information indicating unlicensed spectrum UL resources being allocated to the first UE. Operation proceeds from step 510 to step 512.

In step 512 the first UE determines from the received control information indicating unlicensed spectrum UL resources being allocated to the first UE, a set of resources which have been allocated to the first UE. Operation proceeds from step 512 to step 514.

In step 514 the base station decides to cancel a portion of the unlicensed spectrum UL resources which have been allocated to the first UE. Step 514 includes step 516, in which the base station decides to cancel resources, which have been allocated to the first UE, including one or more of: physical uplink shared channel (PUSCH) resources, sounding reference signal (SRS) resources, physical uplink control channel (PUCCH) resources, and/or physical random access channel (PRACH) resources. In some embodiments, step 514 includes step 516 in which the base station decides to cancel PRACH transmitted by the first UE, which is a RRC_connected UE, based on PDCCH order.

In some embodiments, the UE decides to cancel UL channel resources previously allocated to the first UE, to make the cancelled resources available to be used by another UE having higher priority than the first UE. In some embodiments, the UE decides to cancel UL channel resources previously allocated to the first UE, to leave the cancelled resources intentionally vacant to reduce interference to another UE or collisions with another UE having higher priority than the first UE.

Operation proceeds from step 515 to step 516. In step 516 the base station generates control information including an uplink cancellation indication (CI) indicating a portion of the UL resources previously allocated to the first UE, for which the allocation is being rescinded.

If the resource being cancelled for the first UE is a non-interlaced allocated resource, step 520 includes step 522, in which the base station includes a determined 16 bit resource indication value (RIV) (e.g., in the range of 0 . . . 37949) for parameter frequencyRegionforCI to indicate a cancelled frequency range for a contiguous block.

If the resource being cancelled for the first UE is a interlaced allocated PUSCH resource (resource allocation type 2 for PUSCH), step 520 includes step 524 or step 526. In step 524 the base station includes a determined 6 or 5 bit value (e.g. in the range of 0-63 for 15 kHz SCS or in the range of 0 . . . 31) for 30 kHz SCS) in the 6 or 5 MSBs of the 16 bit resource indication value (RIV) for parameter frequencyRegionforCI-interlaced-r17 to indicate interlace indices of cancelled interlace allocation for PUSCH resources. In this example the 10 LSBs of the RIV are set to 0 and go unused. Note the number of interlaces is M=10 for 15 kHz SCS and M=5 for 30 kHz SCS.

In step 526 the base station includes a determined 6 or 5 bit value (e.g. in the range of 0-63 for 15 kHz SCS or in the range of 0 . . . 31) for 30 kHz SCS) in the 6 or 5 MSBs of the 6 bit resource indication value (RIV) for parameter frequencyRegionforCI-interlaced-r17 to indicate interlace indices of cancelled interlace allocation for PUSCH resources. Note the number of interlaces is M=10 for 15 kHz SCS and M=5 for 30 kHz SCS.

In some embodiments, including step 526, one or both of steps 530 and 532 are performed. In step 530 the allocated range of the TCI value communicated as part of CI is increased by up to 10 additional bits, e.g. unused bits previously pertaining to frequency (because of the efficiency gained by using cancellation indication for interlaces) are repurposed and used to be able to communicate a larger value for TCI. In step 533 the allocated range of the GCI value communicated as part of CI is increased by up to 10 additional bits, e.g. unused bits previously pertaining to frequency (because of the efficiency gained by using cancellation indication for interlaces) are repurposed and used to be able to communicate a larger value for granularity variable GCI.

In some embodiments, e.g., some embodiments, using DL-UL shared occupancy and a BWP greater than 20 MHz, e.g., 40, 60, 80 or 100 MHz, step 534 is included in which new bits, e.g. up to 5 new bits, are included and used in the CI indicating which LBT bandwidths within a BWP have UL cancellations.

In some embodiments, step 536 is included in which the CI includes a RIV used to indicate interlaces being cancelled for PUCCH. Typically the number of interlaces in PUCCH in an interlaced PUCCH, is less than the number of interlaces in the interlaced PUSCH.

Operation proceeds from step 520 to step 537. In step 537 the base station sends, e.g. wirelessly transmits, the control information including the uplink cancellation indication (CI) to the first UE, e.g., in DCI control messages. Operation proceeds from step 537, via connecting node A 538, to step 540.

In step 540 the first UE receive the control information including the uplink cancellation indication (CI). Operation proceeds from step 540 to step 542.

In step 542 the first UE determines if the first UE allocated UL resources is based on interlaces (e.g., type 2 allocation). Operation proceeds from step 542 to step 544. If the determination is that the first UE allocated UL resources is based on interlaces (e.g., type 2 allocation), then operation proceeds from step 544 to step 558. However, if the determination is that the first UE allocated UL resources is not based on interlaces (e.g., not a type 2 allocation), then operation proceeds from step 544 to step 546.

In step 546 the first UE determines if the first cancelled transmission is part of a wideband transmission. Operation proceeds from step 546 to step 548. If the determination is that the cancelled transmission is not part of a wideband transmission, then operation proceeds from step 548 to step 552. However, if the determination is that the cancelled transmission is part of a wideband transmission, then operation proceeds from step 548 to step 550. In step 550 the first UE determines listen-before-talk (LBT) bandwidth(s) with cancelled resources. Operation proceeds from step 550 to step 552.

In step 552 the first UE applies legacy (e.g., Rel-16) cancellation procedure, e.g. optionally extended to include cancellation of PUCCH and/or PRACH. Step 552 includes step 554 and 556. In step 554 the first UE derives the time-frequency resources for cancellation based on BCI, TCI and GCI information. Operation proceeds from step 554 to step 556. In step 556 the first UE cancels upcoming previously granted PUSCH and/or SCS, and optionally PUCCH and/or PRACH, transmissions which use resources with the determined cancellation time-frequency resources. Operation proceeds from step 552 to step 568.

Returning to step 558, in step 558 the first UE determines if the first cancelled transmission is part of a wideband transmission. Operation proceeds from step 558 to step 560. If the determination is that the cancelled transmission is not part of a wideband transmission, then operation proceeds from step 560 to step 564. However, if the determination is that the cancelled transmission is part of a wideband transmission, then operation proceeds from step 560 to step 562. In step 562 the first UE determines listen-before-talk (LBT) bandwidth(s) with cancelled resources. Operation proceeds from step 562 to step 564.

In step 564 the first UE derives interlace indice(s) of cancelled region(s) and identifies cancelled resources (e.g., cancelled PUSCH resources (where interlacing is used) or cancelled PUCCH resources (where interlacing is used), e.g., based on the determined interlace indice(s) and time information, e.g., TCI and time granularity information GCI, and/or identifies cancelled resources based on cancelled bandwidth information for a wideband signal. Operation proceeds from step 564 to step 566. In step 566 the first UE cancels previously allocated PUSCH, PUCCH, SRS, and/or PRACH transmissions overlapping with identified cancelled resources. Operation proceeds from step 566 to step 568.

In step 568 the first UE determines if the cancelled transmission is part of a time-contiguous multi-slot burst. If the determination is that the cancelled transmission is part of a time-contiguous multi-slot burst, then operation proceeds from step 568 to step 570. In step 570 the first UE modifies the LBT category of remaining transmissions. Step 570 may, and sometimes does, include step 572 or step 574. In step 572 the first UE converts an originally scheduled category-1 (Cat-1) LBT for the burst within a shared co-occupancy (CO) to a category-2 (Cat-2) LBT, in response to a first slot of the UL transmission burst being cancelled by the UL CI. In step 574 the first UE converts an originally scheduled category-2 (Cat-2) LBT for the burst within a shared co-occupancy (CO) to a category-4 (Cat-4) LBT with channel access priority class (CAPC) corresponding to the lowest priority traffic in the UL burst, in response to a first slot of the UL transmission burst being cancelled by the UL CI. Operation proceeds from step 568 or step 570, via connecting node B 568 to step 504.

Figure 6:
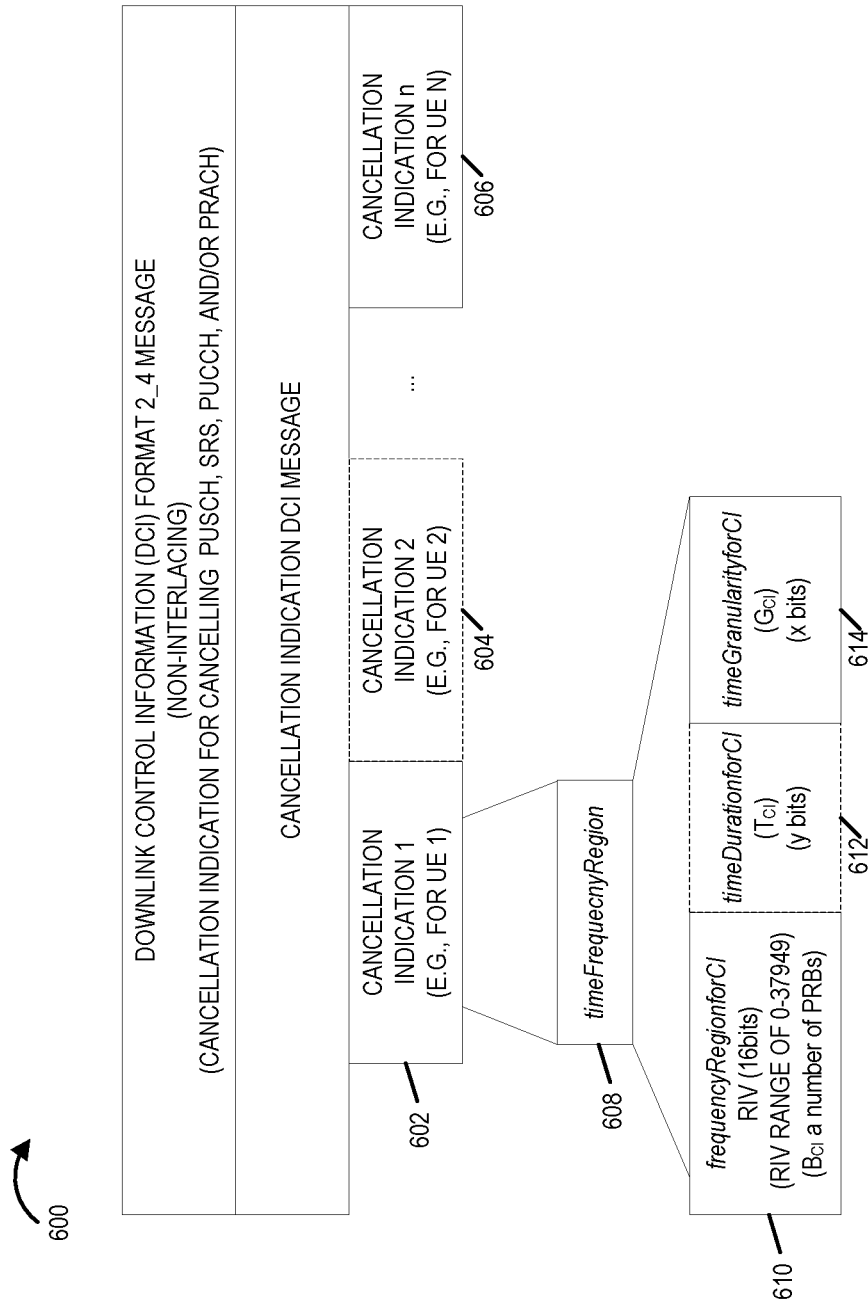
FIG. 6 is a drawing illustrating an exemplary downlink control information (DCI) format 2_4 message for communicating cancellation indication (CI) for non-interlacing uplink channel resources, in accordance with an exemplary embodiment.

FIG. 6 is a drawing illustrating an exemplary downlink control information (DCI) format 2_4 message 600 for communicating cancellation indication (CI) for non-interlacing uplink channel resources, referred to as cancellation indication DCI message, in accordance with an exemplary embodiment. The cancellation indication DCI message 600 includes a cancellation indication field for one or more UEs (BS selected UEs, e.g. low priority UEs) for which previously allocated UL resources are to be cancelled (cancellation indication 1 602, cancellation indication 2 604, . . . , cancellation indication N 606). Cancellation indication 1 602 includes timeFrequncyRegion information 608. The timeFrequncyRegion information 608 frequencyRegionforCI information 610, timeDurationforCI information 612 and timeGranularityforCI information 614. The frequencyRegionforCI information 610 conveys a 16 bit resource indicator value (RIV) in the range of 0-37949, used to indicate a number of contiguous PRBs (in the frequency domain) and the location in the frequency domain, e.g. start of block. The timeDurationforCI information 612, optionally included depending upon whether or not a default value is not be used, includes y bits in a field used to convey a value for determining a number of OFDM symbols in the time domain. The timeGranularityforCI information 614 includes x bits in a field and is used to convey a value used to determine a value indicating how the time domain is subdivided when it is subdivided.

Figure 7:
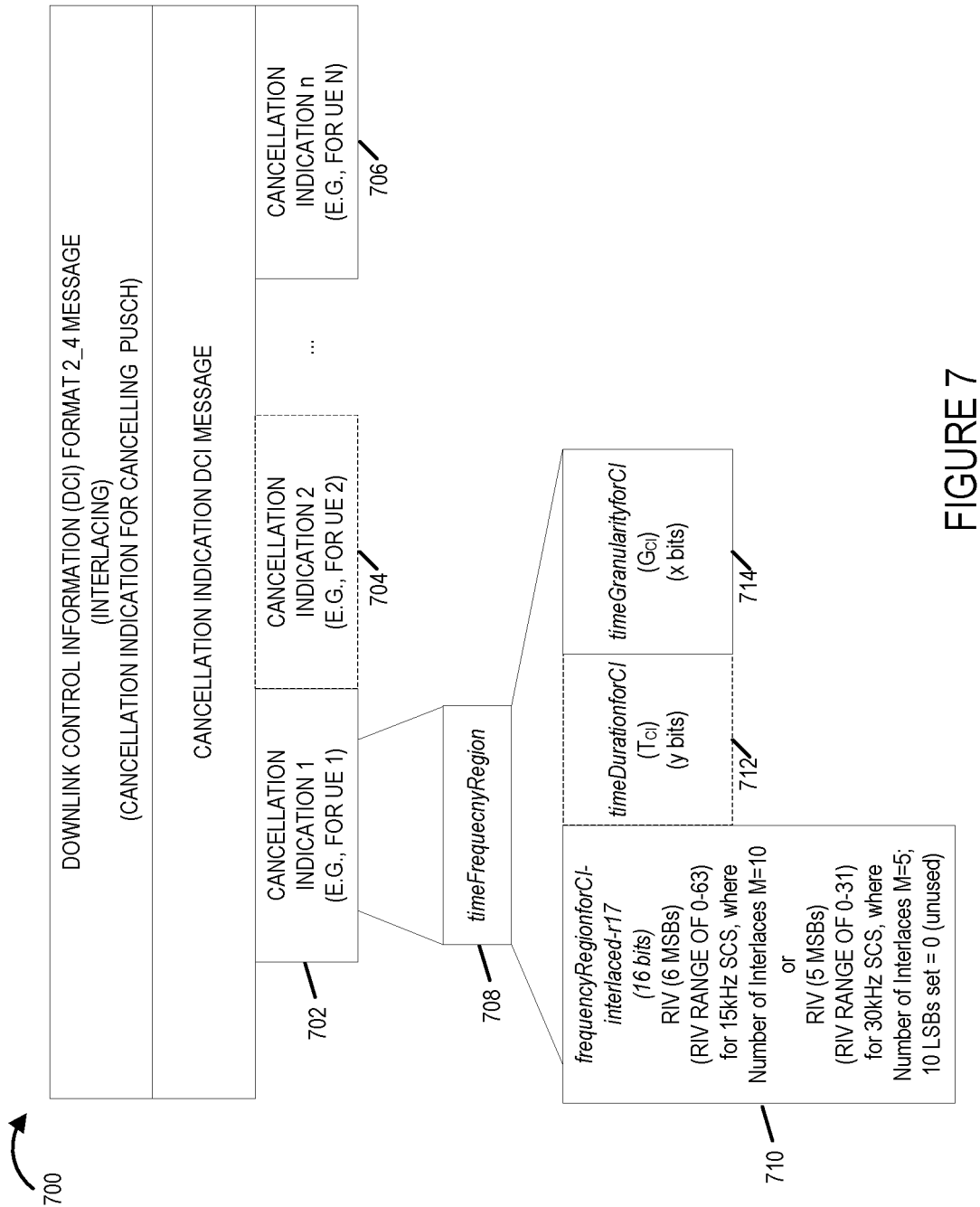
FIG. 7 is a drawing illustrating an exemplary downlink control information (DCI) format 2_4 message for communicating cancellation indication (CI) for physical uplink shared channel (PUSCH) resources with interlacing, in accordance with an exemplary embodiment.

FIG. 7 is a drawing illustrating an exemplary downlink control information (DCI) format 2_4 message 700 for communicating cancellation indication (CI) for physical uplink shared channel (PUSCH) resources with interlacing, referred to as cancellation indication DCI message, in accordance with an exemplary embodiment. The cancellation indication DCI message 700 includes a cancellation indication field for one or more UEs (BS selected UEs, e.g. low priority UEs) for which previously allocated UL resources are to be cancelled (cancellation indication 1 702, cancellation indication 2 704, . . . , cancellation indication N 706). Cancellation indication 1 702 includes timeFrequncyRegion information 708. The timeFrequncyRegion information 708 frequencyRegionforCI-interlaced-r17 information 710, timeDurationforCI information 712 and timeGranularityforCI information 714. The frequencyRegionforCI-interlaced-r17 information 710 conveys a 16 bit resource indicator value (RIV) of which the 6 MSBs are used with a RIV range of 0-63 for 15 kHz SCS, where the number of interlaces M=10 or of which the 5 MSBs are used with a RIV range of 0-31 for 30 kHz SCS, where the number of interlaces M=5; and where the 10 LSBs are set to 0 and are not used. The timeDurationforCI information 712, optionally included depending upon whether or not a default value is not be used, includes y bits in a field used to convey a value for determining a number of OFDM symbols in the time domain. The timeGranularityforCI information 714 includes x bits in a field and is used to convey a value used to determine a value indicating how the time domain is subdivided when it is subdivided.

Figure 8:
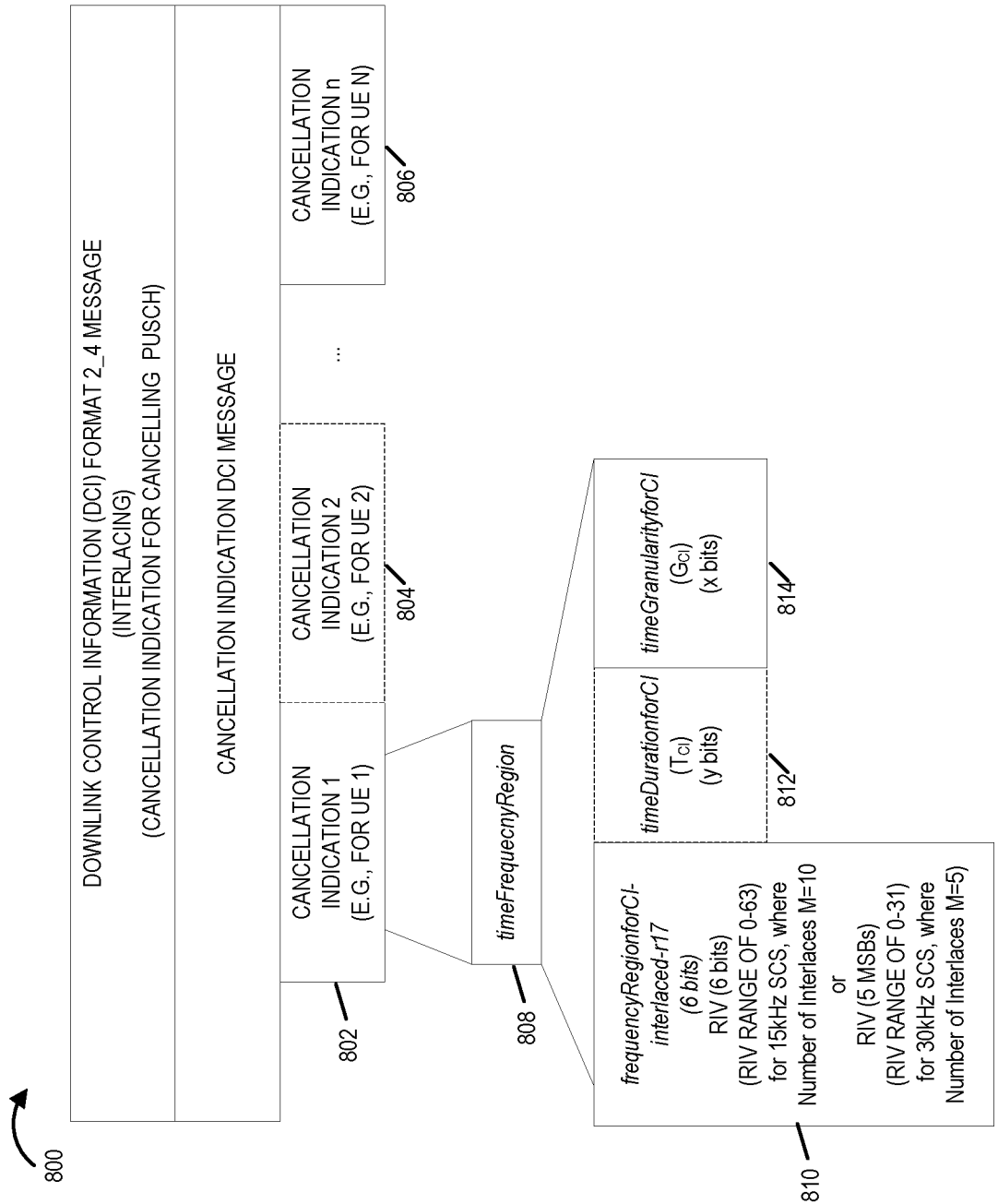
FIG. 8 is a drawing illustrating another exemplary downlink control information (DCI) format 2_4 message for communicating cancellation indication (CI) for physical uplink shared channel (PUSCH) resources with interlacing, in accordance with an exemplary embodiment.

FIG. 8 is a drawing illustrating another exemplary downlink control information (DCI) format 2_4 message 800 for communicating cancellation indication (CI) for physical uplink shared channel (PUSCH) resources with interlacing, referred to as cancellation indication DCI message, in accordance with an exemplary embodiment. The cancellation indication DCI message 800 includes a cancellation indication field for one or more UEs (BS selected UEs, e.g. low priority UEs) for which previously allocated UL resources are to be cancelled (cancellation indication 1 802, cancellation indication 2 804, . . . , cancellation indication N 806). Cancellation indication 1 802 includes timeFrequncyRegion information 808. The timeFrequncyRegion information 808 frequencyRegionforCI-interlaced-r17 information 810, timeDurationforCI information 812 and timeGranularityforCI information 814. The frequencyRegionforCI-interlaced-r17 information 810 conveys a 6 bit resource indicator value (RIV) of which the 6 bits are used with a RIV range of 0-63 for 15 kHz SCS, where the number of interlaces M=10 or of which the 5 MSBs are used with a RIV range of 0-31 for 30 kHz SCS, where the number of interlaces M=5. The timeDurationforCI information 812, optionally included depending upon whether or not a default value is not be used, includes y bits in a field used to convey a value for determining a number of OFDM symbols in the time domain. The timeGranularityforCI information 814 includes x bits in a field and is used to convey a value used to determine a value indicating how the time domain is subdivided when it is subdivided.

It should be noted the cancellation indication DCI message 700 includes 10 less bits than the cancellation indication DCI messages 600 and 700, for the case where each message communicates only one cancellation indication, e.g. for UE 1, and where the conditions are the same with regard to inclusion of the TCI. In an example, where the cancellation indication DCI message carries multiple cancellation indications, the overhead saving can be up to 10 bits per cancellation indication.

Figure 9:
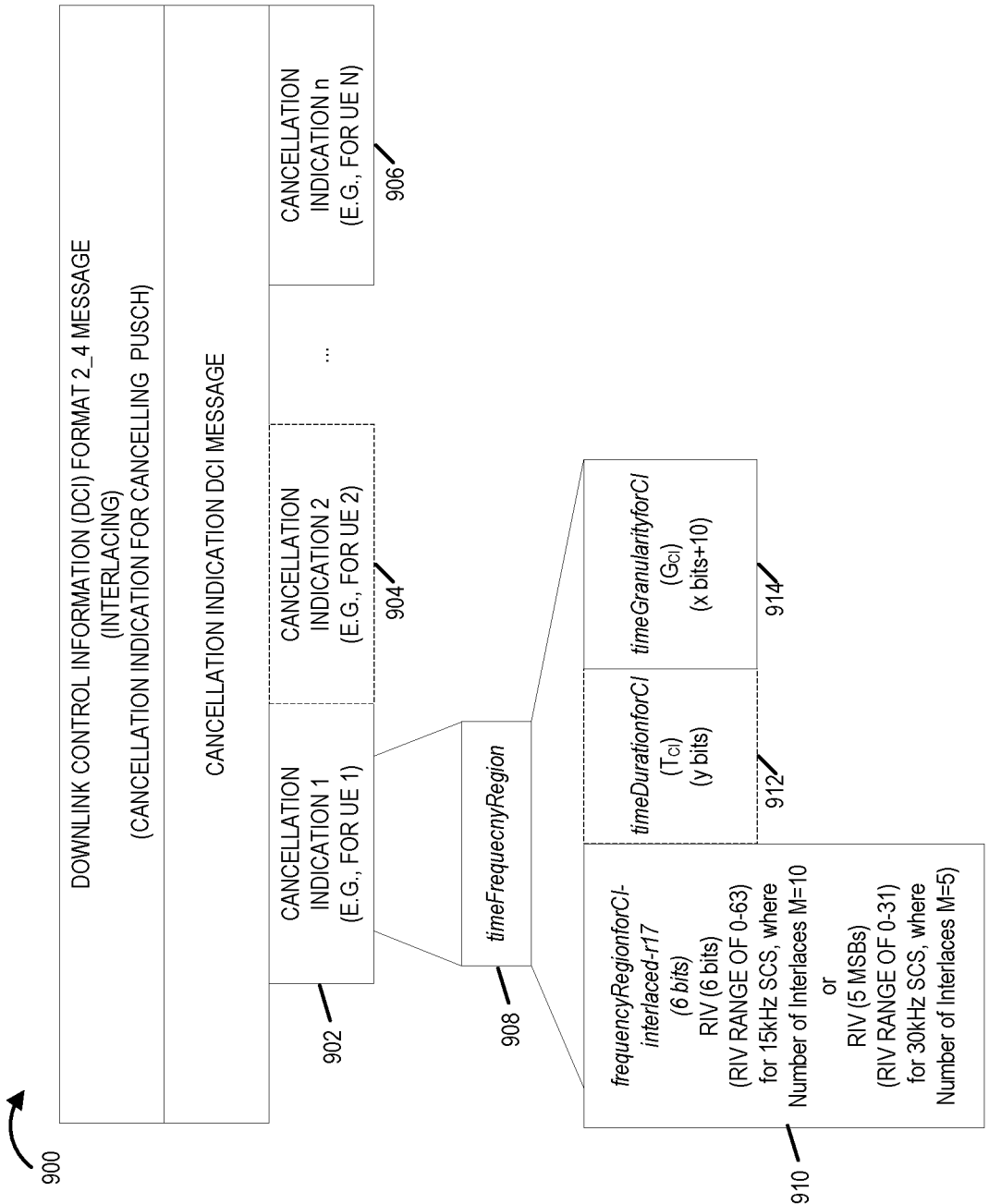
FIG. 9 is a drawing illustrating yet another exemplary downlink control information (DCI) format 2_4 message for communicating cancellation indication (CI) for physical uplink shared channel (PUSCH) resources with interlacing, in accordance with an exemplary embodiment.

FIG. 9 is a drawing illustrating yet another exemplary downlink control information (DCI) format 2_4 message 900 for communicating cancellation indication (CI) for physical uplink shared channel (PUSCH) resources with interlacing, referred to as cancellation indication DCI message, in accordance with an exemplary embodiment. The cancellation indication DCI message 900 includes a cancellation indication field for one or more UEs (BS selected UEs, e.g. low priority UEs) for which previously allocated UL resources are to be cancelled (cancellation indication 1 902, cancellation indication 2 904, . . . , cancellation indication N 906). Cancellation indication 1 902 includes timeFrequncyRegion information 908. The timeFrequncyRegion information 908 frequencyRegionforCI-interlaced-r17 information 910, timeDurationforCI information 912 and timeGranularityforCI information 914. The frequencyRegionforCI-interlaced-r17 information 910 conveys a 6 bit resource indicator value (RIV) of which the 6 bits are used with a RIV range of 0-63 for 15 kHz SCS, where the number of interlaces M=10 or of which the 5 MSBs are used with a RIV range of 0-31 for 30 kHz SCS, where the number of interlaces M=5. The timeDurationforCI information 912, optionally included depending upon whether or not a default value is not be used, includes y bits in a field used to convey a value for determining a number of OFDM symbols in the time domain. The timeGranularityforCI information 914 includes×bits+10 addition bits in a field and is used to convey a value used to determine a value indicating how the time domain is subdivided when it is subdivided.

The approach of including additional bits in the granularity information field 914 allows for a higher level of sub-division in the time domain being applied as to which resources should be canceled. Thus cancellation indication DCI message 900 can be the same overall size as message 600 or 700 yet have higher granularity with regard to cancellation.

Figure 10:
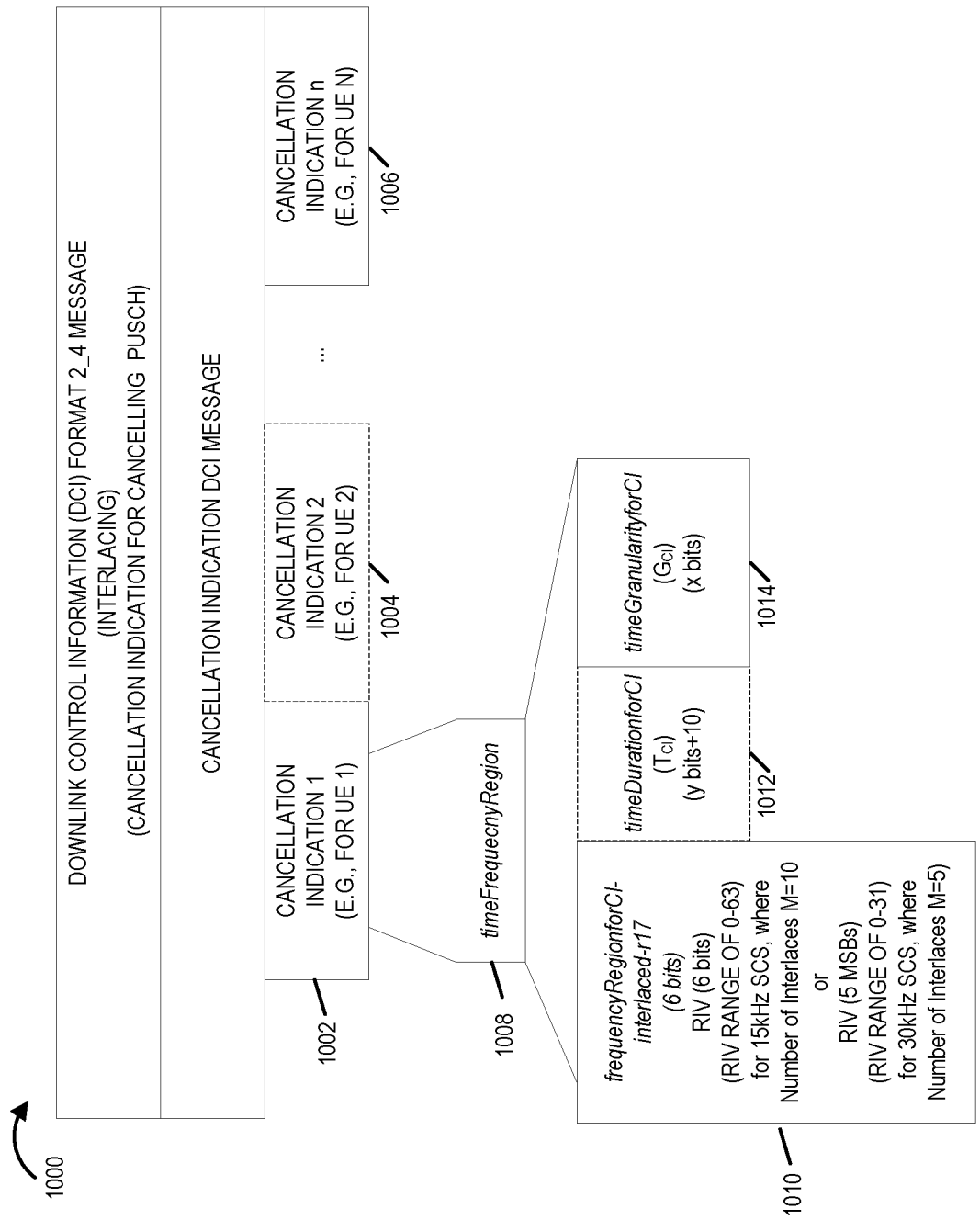
FIG. 10 is a drawing illustrating still another exemplary downlink control information (DCI) format 2_4 message for communicating cancellation indication (CI) for physical uplink shared channel (PUSCH) resources with interlacing, in accordance with an exemplary embodiment.

FIG. 10 is a drawing illustrating still another exemplary downlink control information (DCI) format 2_4 message 1000 for communicating cancellation indication (CI) for physical uplink shared channel (PUSCH) resources with interlacing, referred to as cancellation indication DCI message, in accordance with an exemplary embodiment. The cancellation indication DCI message 1000 includes a cancellation indication field for one or more UEs (BS selected UEs, e.g. low priority UEs) for which previously allocated UL resources are to be cancelled (cancellation indication 1 1002, cancellation indication 2 1004, . . . , cancellation indication N 1006). Cancellation indication 1 1002 includes timeFrequncyRegion information 1008. The timeFrequncyRegion information 1008 frequencyRegionforCI-interlaced-r17 information 1010, timeDurationforCI information 1012 and timeGranularityforCI information 1014. The frequencyRegionforCI-interlaced-r17 information 1010 conveys a 6 bit resource indicator value (RIV) of which the 6 bits are used with a RIV range of 0-63 for 15 kHz SCS, where the number of interlaces M=10 or of which the 5 MSBs are used with a RIV range of 0-31 for 30 kHz SCS, where the number of interlaces M=5. The timeDurationforCI information 1012, optionally included depending upon whether or not a default value is not be used, includes y bits+10 additional bits in a field, used to convey a value for determining a number of OFDM symbols in the time domain. The timeGranularityforCI information 914 includes x bits in a field and is used to convey a value used to determine a value indicating how the time domain is subdivided when it is subdivided.

The approach of including additional bits in the time duration field 1012 allows for a longer time interval to be used for communicating resources should be canceled. Thus cancellation indication DCI message 1000 can be the same overall size as message 600 or 700 yet have a longer duration for cancellation consideration and cancellation indication.

Figure 11:
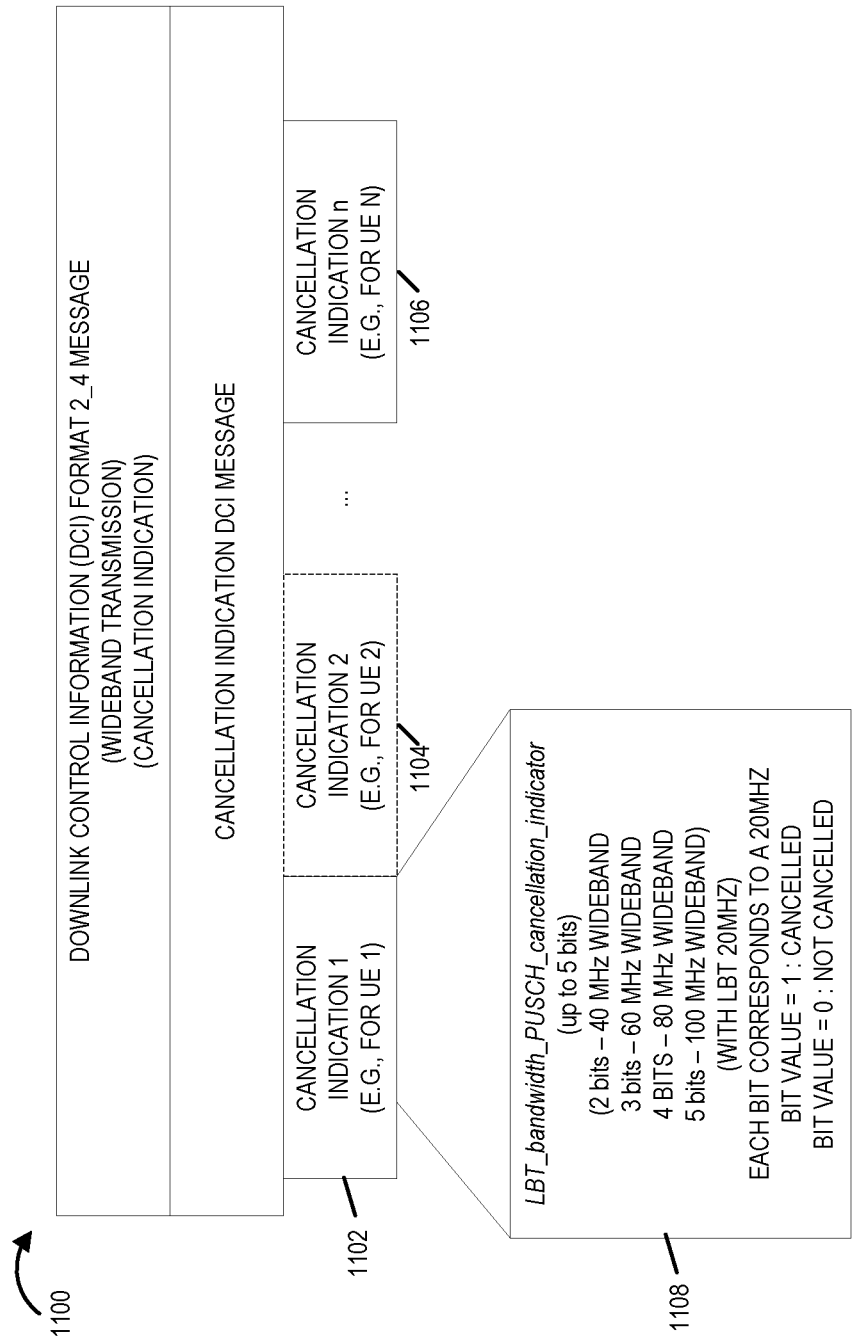
FIG. 11 is a drawing illustrating an exemplary downlink control information (DCI) format 2_4 message for communicating cancellation indication (CI) for wideband transmission, in accordance with an exemplary embodiment.

FIG. 11 is a drawing illustrating an exemplary downlink control information (DCI) format 2_4 message 1100 for communicating cancellation indication (CI) for wideband transmission, referred to as cancellation indication DCI message, in accordance with an exemplary embodiment. The cancellation indication DCI message 1100 includes a cancellation indication field for one or more UEs (BS selected UEs, e.g. low priority UEs) for which previously allocated UL resources are to be cancelled (cancellation indication 1 1102, cancellation indication 2 1104, . . . , cancellation indication N 1106). Cancellation indication 1 1002 includes LBT_bandwidth_PUSCH_cancellation_indicator information 1108. The LBT_bandwidth_PUSCH_cancellation_indicator information 1108 is a field of up to 5 bits, e.g. depending on the size of the wideband BWP. For example, 2 bits are used for a 40 MHz wideband BWP; 2 bits are used for a 60 MHz wideband BWP; 4 bits are used for a 80 MHz wideband BWP; and 5 bits are used for a 100 MHz wideband BWP. Each bit corresponds to a 20 MHz band; and a bit value=1 indicates the PUSCH is cancelled for the 20 MHz band portion of the wideband BWP; while a bit value=0 indicates that the PUSCH is not cancelled for the 20 MHz band portion of the wideband BWP.

The cancellation indication (described as being in cancellation indication DCI messages) for the UL resources which have been previously allocated, is communicated to the UEs via downlink control information, e.g. using DCI format 2_4. Control information including the cancellation indication is generated based on the DCI formats, processed and the results are included in DCI messages which are sent, e.g., broadcast to the UEs for receipt and recovery of information.

Figure 12:
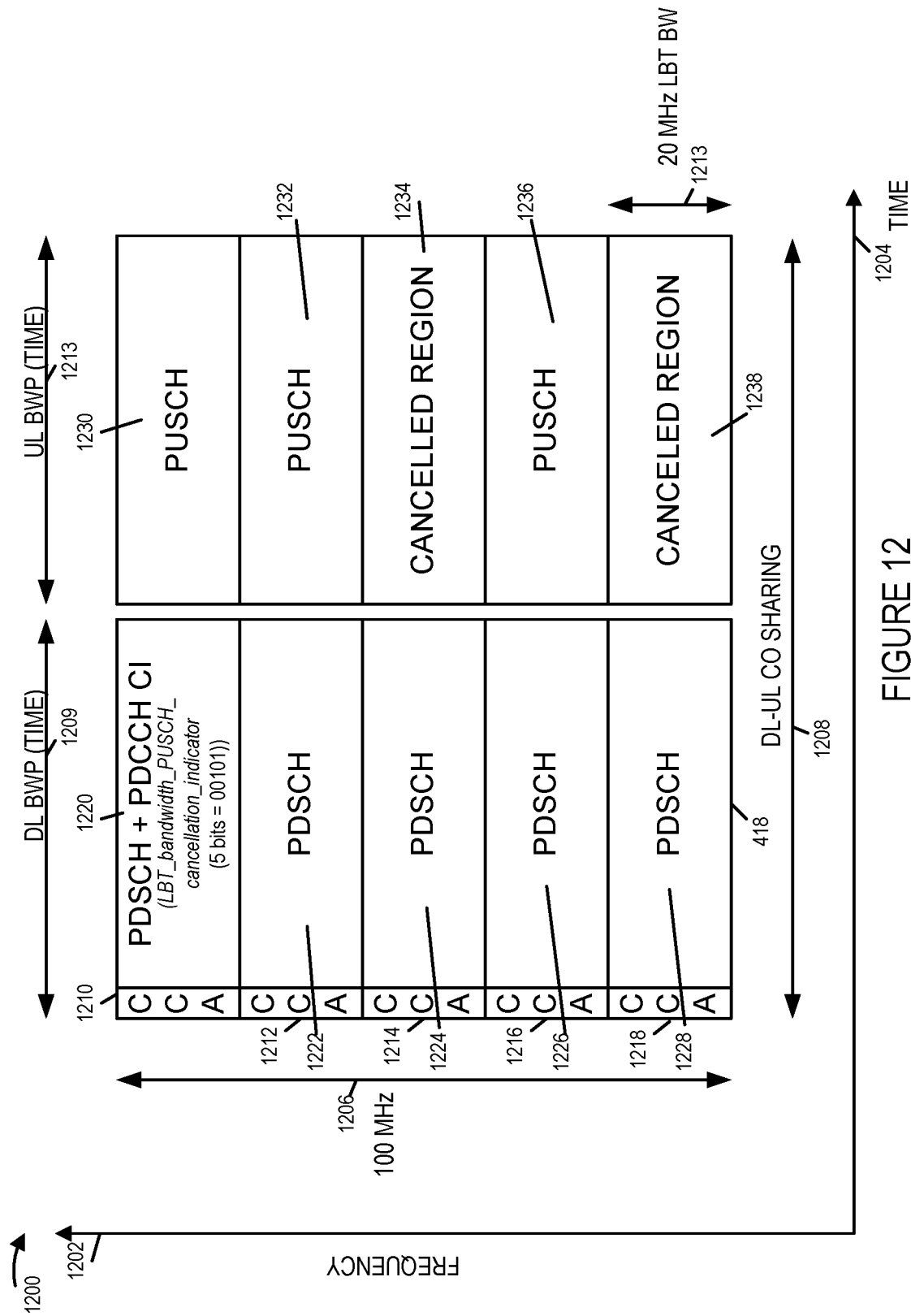
FIG. 12 is a drawing illustrating an example in which a cancellation indication (CI) identifies which previously allocated PUSCH transmission resources are being cancelled on a per 20 MHz block basis within a 100 MHz wideband bandwidth part (BWP) for an example of DL-UL co-occupancy sharing.

FIG. 12 is a drawing 1200 illustrating an example in which a cancellation indication (CI) identifies which previously allocated PUSCH transmission resources are being cancelled on a per 20 MHz block basis within a 100 MHz wideband bandwidth part (BWP) for an example of DL-UL co-occupancy sharing. FIG. 12 is a drawing 1200 illustrating a plot of frequency on vertical axis 1202 vs time on horizontal axis 1204 for an example of DL-UL channel occupancy sharing 1208. In this example the BWP of 100 MHz 1206 includes 500 20 MHz portions. During a first time interval 1209 the 100 MHz BWP is used as a DL BWP; and during a second time interval 1211, the 100 MHz BWP is used as an UL BWP.

The LBT is performed on a 20 MHz basis, as indicated by arrow 1213. Clear channel assessments (CCAs) 1210, 1212, 1214, 1216, 1218 are performed at the start of the DL BWP. Resources 1220 of the DL BWP includes PDSCH resources+PDCCH resources used to communicate a Cancellation Indication (CI). In this example, the CI communicates a LBT_bandwidth_PUDSCH_cancellation_indicator of 5 bits=00101, which indicates the previously allocated PUSCH resource allocations have been cancelled for the lowest and third lowest 20 MHz bands with the 100 MHz BWP.

Resources 1222, 1224, 1226, 1228 of the DL BWP include PDSCH resources. The CI signal indicates that UL BWP portion resources 1234 and 1238 has been canceled with regard to being used as PUSCH for the UE to which the CI is directed. UL BWP resources 1230, 1232, and 1236 are still to used by the UE for PUSCH.

Figure 13:
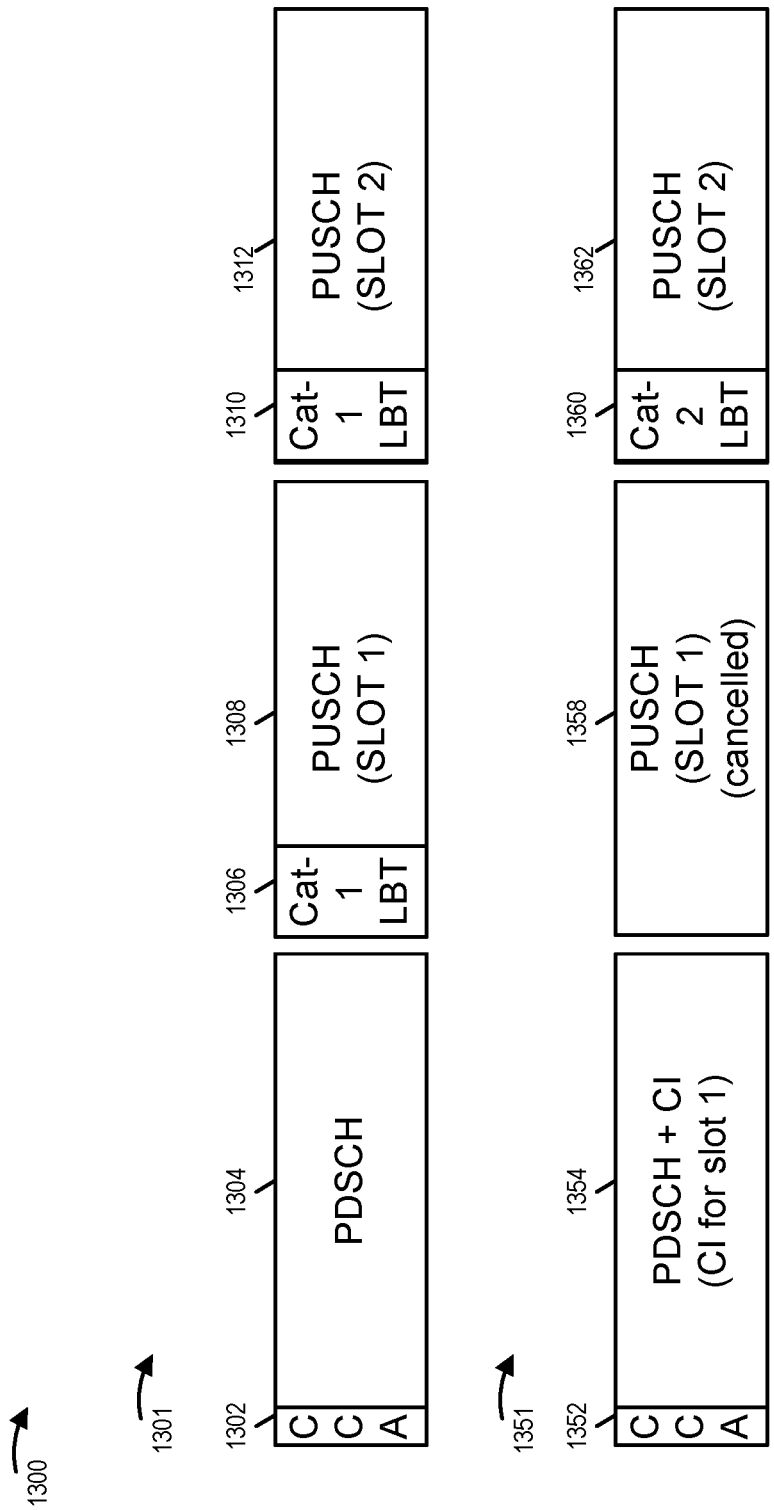
FIG. 13 illustrates an example of a multi-slot PUSCH allocation in which a cancellation indication (CI) cancels a first PUSCH slot, and the LBT for the second PUSCH slot is changed from category 1 LBT to a category 2 LBT, in accordance with a feature of some embodiments of the present invention.

FIG. 13 is a drawing 1300 which illustrates an example of a multi-slot PUSCH allocation in which a cancellation indication (CI) cancels a first PUSCH slot, and the LBT for the second PUSCH slot is changed from category 1 LBT to a category 2 LBT, in accordance with a feature of some embodiments of the present invention.

Drawing 1301, which serves as a baseline, illustrates an example of the multi-slot PUSCH allocation without a CI being sent. CCA 1302 is performed, followed by use of the resources 1304 for the PDSCH. Following a small gap, the UE performs a Cat-1 LBT 1306, followed by use of the PUSCH slot 1 1308 by the UE. This is followed by another small gap, and then a Cat-1 LBT 1310, followed by use of the PUSCH slot 2 1312 by the UE.

Drawing 1351 illustrates an example of the multi-slot PUSCH allocation with a CI being sent to cancel use of PUSCH slot 1 by the UE for which it was allocated. CCA 1352 is performed, followed by use of the resources 1354 for the PDSCH by the base station+the sending of a CI, which indicates that the upcoming 1st PUSCH slot is being cancelled for use by the UE. The UE to which the PUSCH slot 1 was previously assigned, recognizes from the CI that slot 1 has been cancelled and refrains from using the resources 1358 for slot 1 PUSCH. Then the UE performs a Cat-2 LBT 1360 (instead of the originally planned Cat-1 LBT 1310), followed by use of the resource 1362 by the UE for PUSCH slot 2 signaling.

Figure 14:
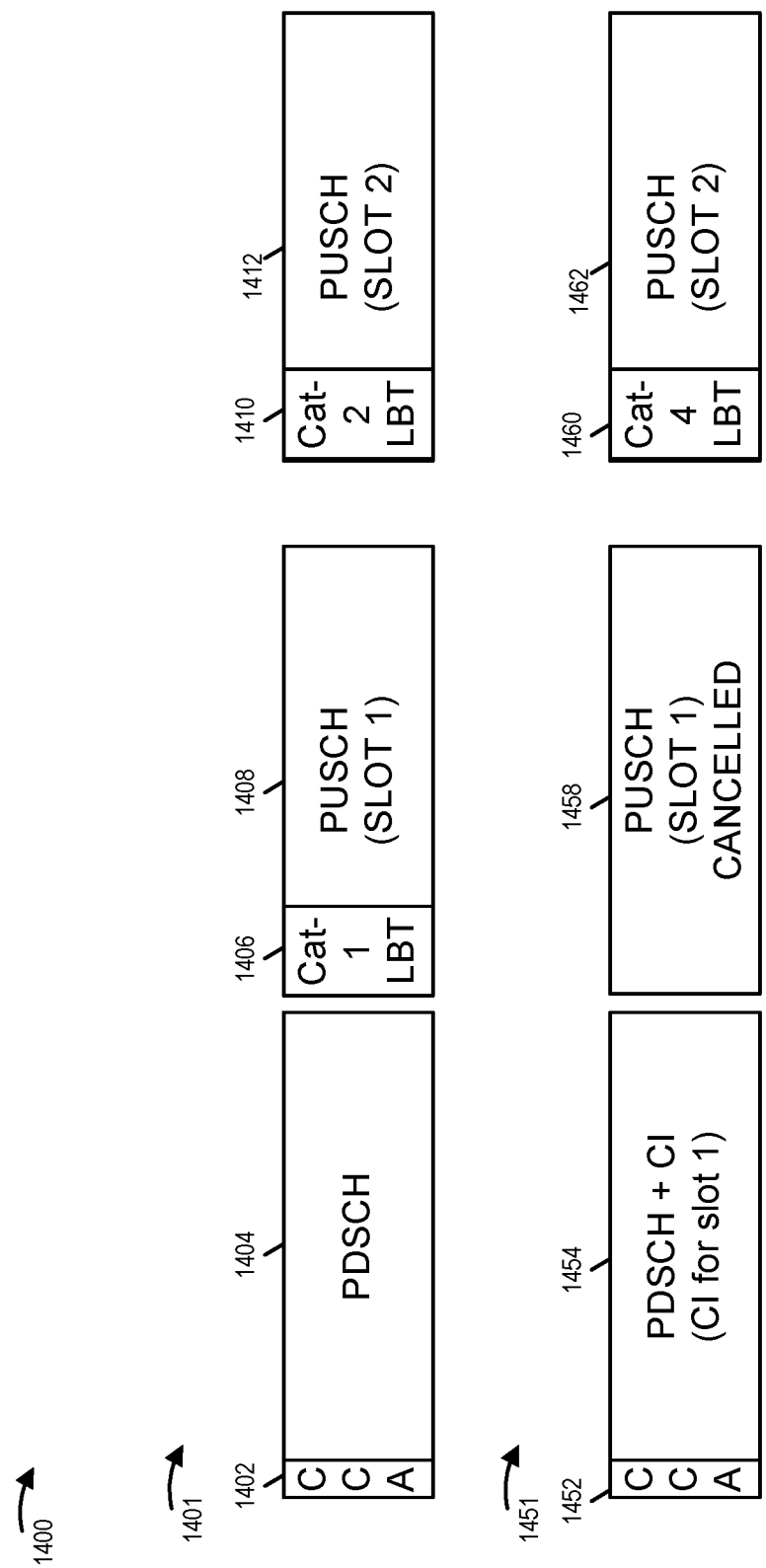
FIG. 14 illustrates an example of a multi-slot PUSCH allocation in which a cancellation indication (CI) cancels a first PUSCH slot, and the LBT for the second PUSCH slot is changed from category 2 LBT to a category 4 LBT, in accordance with a feature of some embodiments of the present invention.

FIG. 14 is a drawing 1400 illustrates an example of a multi-slot PUSCH allocation in which a cancellation indication (CI) cancels a first PUSCH slot, and the LBT for the second PUSCH slot is changed from category 2 LBT to a category 4 LBT, in accordance with a feature of some embodiments of the present invention.

Drawing 1401, which serves as a baseline, illustrates an example of the multi-slot PUSCH allocation without a CI being sent. CCA 1402 is performed, followed by use of the resources 1402 by the base station for the PDSCH. Following a small gap, the UE performs a Cat-1 LBT 1406, followed by use of the PUSCH slot 1 1408 by the UE. This is followed by a gap (large enough to require Cat-2), and then a Cat-2 LBT 1410 is performed, followed by use of the PUSCH slot 2 1412 by the UE.

Drawing 1451 illustrates an example of the multi-slot PUSCH allocation with a CI being sent to cancel use of PUSCH slot 1 by the UE for which it was allocated. CCA 1452 is performed, followed by use of the resources 1454 for the PDSCH by the base station+the sending of a CI, which indicates that the upcoming 1st PUSCH slot is being cancelled for use by the UE. The UE to which the PUSCH slot 1 was previously assigned, recognizes from the CI that slot 1 has been cancelled and refrains from using the resources 1458 for originally intended slot 1 PUSCH. Then the UE performs a Cat-4 LBT 1460 (instead of the originally planned Cat-2 LBT 1410), followed by use of the resource 1462 by the UE for PUSCH slot 2 signaling.

Figure 15A:
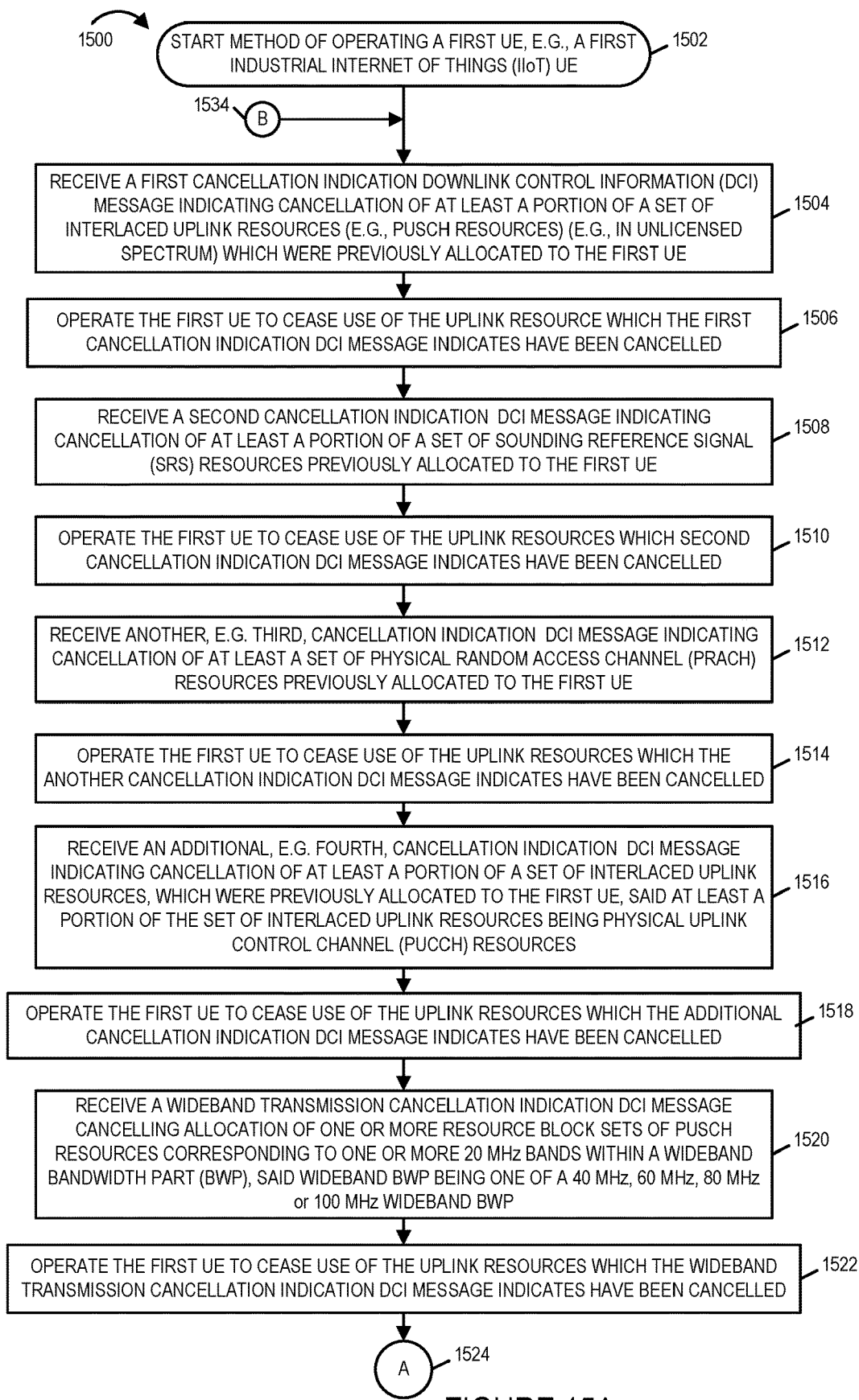
FIG. 15A is a first part of a flowchart of an exemplary method of operating a first user equipment in accordance with an exemplary embodiment.
Figures 15, 15A, 15B:
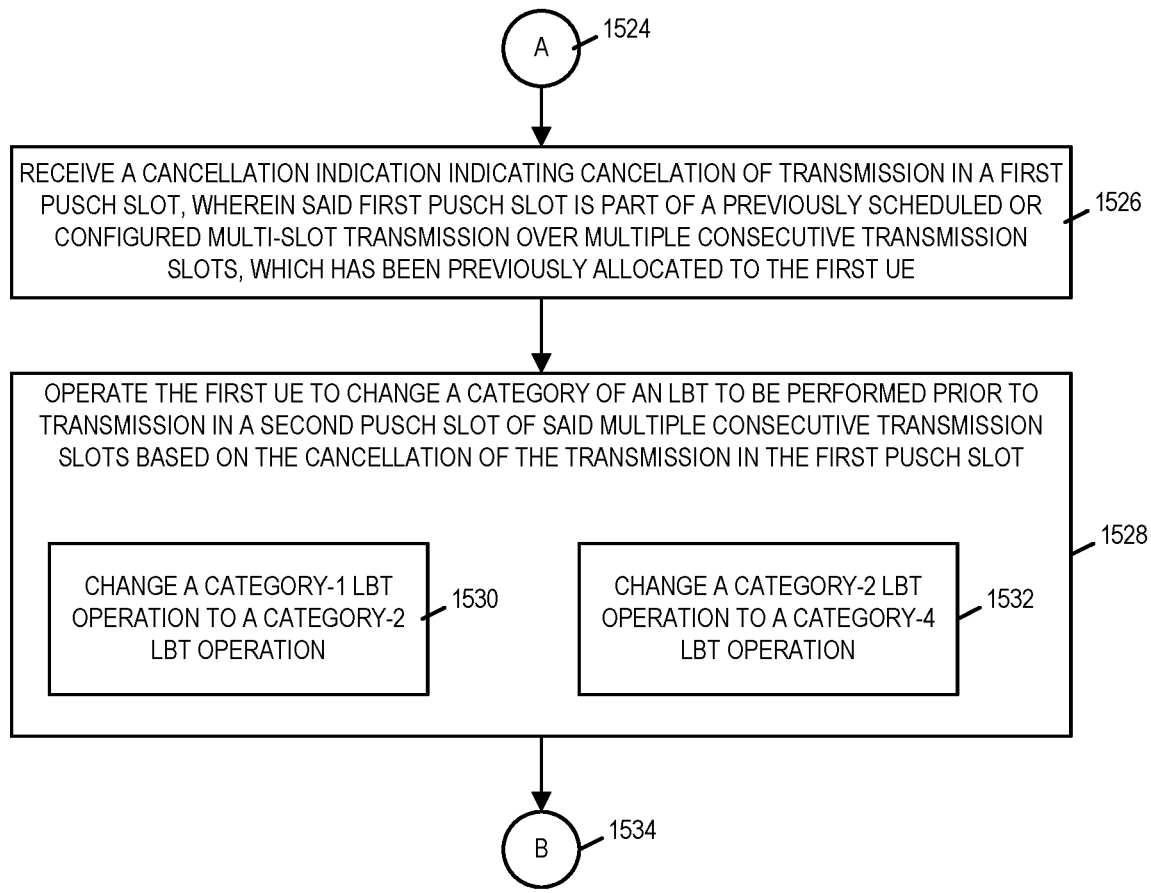
FIG. 15B is a second part of a flowchart of an exemplary method of operating a first user equipment in accordance with an exemplary embodiment.
FIG. 15 comprises the combination of FIG. 15A and FIG. 15B.

FIG. 15, comprising the combination of FIG. 15A and FIG. 15B, is a flowchart 1500 of an exemplary method of operating a first user equipment (UE), e.g., UE 1 1612, in accordance with an exemplary embodiment. In some embodiments, the first UE device is a UE using unlicensed spectrum. In some embodiments, said first UE is a UE with a first priority such that its resources may be, and sometimes are, cancelled and re-allocated to one or more UEs having a higher priority, e.g. second priority, which is higher than said first priority. In some embodiments, the first UE is a UE with relatively low priority such that its resources may be cancelled and re-allocated to other higher priority UEs. Operation starts in step 1502 in which the first UE device is powered on and initialized. Operation proceeds from start step 1502 to step 1504.

In step 1504 the first UE receives a first cancellation downlink control information (DCI) message indicating cancellation of at least a portion of a set of interlaced uplink resources, e.g. a set of interlaced PUSCH resources in unlicensed spectrum, which were previously allocated to the first UE. In some embodiments, first UE uses unlicensed spectrum and said first cancellation indication DCI message indicates cancellation of unlicensed spectrum, e.g., IIoT unlicensed spectrum, communications resources. In some embodiments, the first cancellation indication DCI message cancels Physical Uplink Shared Channel (PUSCH) resources. Operation proceeds from step 1504 to step 1506.

In step 1506 the first UE is operated to cease use of the uplink resources which the first cancellation indication DCI message indicates have been cancelled. Operation proceeds from step 1506 to step 1508.

In step 1508 the first UE receives a second cancellation indication DCI message indicating cancellation of at least a portion of a set of sounding reference signal (SRS) resources previously allocated to the first UE. Operation proceeds from step 1508 to step 1510.

In step 1510 the first UE is operated to cease use of the uplink resources which the second cancellation indication DCI message indicates have been cancelled. Operation proceeds from step 1510 to step 1512.

In some embodiments, the second cancellation indication DCI message cancels a contiguous block of SRS resources. In some such embodiments, the first cancellation indication message cancels a first set of PUSCH resources corresponding to first interlacing index and a second set of PUSCH resources corresponding to a second interlacing index, said first and second interlacing indices being different.

In some embodiments, the first cancellation indication DCI message includes less bits for communicating time and frequency resource information than the second cancellation indication DCI message (e.g., with regard to CI sent to the first UE).

In some embodiments, the first cancellation indication DCI message includes a resource indicator value (RIV), used to communicate frequency region cancellation information, having less bits than a RIV, used to communicate frequency region cancellation information, included in the second cancellation indication DCI message.

In some embodiments, the first cancellation indication DCI message includes 6 bits for the RIV value used to communicate frequency region cancellation information. In some such embodiments, the second cancellation indication DCI message includes 16 bits for the RIV value used to communicate frequency region cancellation information.

In some embodiments, the second cancellation indication DCI message includes less bits for the field used to communicate time granularity information (GCI), than the first cancellation indication DCI message.

In some embodiments, the second cancellation indication DCI message includes less bits for the field used to communicate time information (TCI), than the first cancellation indication DCI message.

In step 1512 the first UE receives another, e.g., a third, cancellation indication DCI message indicating cancellation of at least a portion of a set of physical random access channel (PRACH) resources previously allocated to the first UE. In some embodiments, the another cancellation indication DCI message cancels a contiguous block of PRACH resources. Operation proceeds from step 1512 to step 1514.

In step 1514 the first UE is operated to cease use of the uplink resources which the another cancellation indication DCI message indicates have been cancelled. Operation proceeds from step 1514 to step 1516.

In step 1516 the first UE receives an additional, e.g., a fourth, cancellation indication DCI message indicating cancellation of at least a portion of a set of interlaced resources which were previously allocated to the first UE, said at least a portion of a set of interlaced resources being physical uplink control channel (PUCCH) resources. Operation proceeds from step 1516 to step 1518.

In step 1518 the first UE is operated to cease use of the uplink resources which the additional cancellation indication DCI message indicates have been cancelled. Operation proceeds from step 1518 to step 1520.

In step 1520 the first UE receives a wideband transmission cancellation indication DCI message cancelling allocation of one or more resource block sets of PUSCH resources corresponding to one or more 20 MHz bands within a wideband bandwidth part (BWP), said wideband BWP being one of a 40 MHz, 60 Mz, 80 MHz or 100 MHz wideband BWP. In some embodiments, the wideband transmission cancellation indication DCI message includes a listen-before-talk (LBT) bandwidth PUSCH indicator indicating which ones of the one or more 20 MHz bands in the wideband PUSCH resources allocated to the first UE are being canceled. In some such embodiments, the LBT bandwidth PUSCH indicator includes 2 to 5 bits, said number of bits being a function of the width of the wideband PUSCH resource allocated to the first UE. Operation proceeds from step 1520 to step 1522.

In step 1522 the first UE is operated to cease use of the uplink resources which the wideband transmission cancellation indication DCI message indicates have been cancelled. Operation proceeds from step 1522, via connecting node A 1524 to step 1526.

In step 1526 the first UE receives a cancellation indication indicating cancellation of transmission in a first PUSCH slot, wherein the first PUSCH slot is part of a previously scheduled or configured multi-slot transmission over multiple consecutive slots, which has been previously allocated to the first UE. Operation proceeds from step 1526 to step 1528.

In step 1528 the first UE changes a category of an LBT to be performed prior to transmission in a second PUSCH slot of said multiple consecutive transmission slots based on the cancellation of the transmission in the first PUSCH slot. In some embodiments, performing an iteration of step 1528 includes performing one of step 1530 or step 1532. In step 1530 the first UE changes a category-1 (Cat-1) LBT operation to a category-2 (Cat-2) LBT operation. In step 1532 the first UE changes a category-2 (Cat-2) LBT operation to a category-4 (Cat-4) LBT operation, e.g., with channel access priority class (CACP) corresponding to the lowest priority traffic in the UL burst. Operation proceeds from step 1528, via connecting node B 1534, to step 1504.

FIG. 16 is a drawing of an exemplary communications system 1600 in accordance with an exemplary embodiment. Exemplary communications system 1600 includes a plurality of base stations (base station 1 1602, . . . , base station N 1604), each with a corresponding wireless coverage area (1603, 1605), respectively, and a plurality of network nodes (network node 1, e.g., a gateway node, . . . , network node M 1608, e.g., a core node) coupled together via backhaul 1610 and/or the Internet. The base stations (1602, . . . , 1604) support wireless communications using unlicensed spectrum, e.g. unlicensed spectrum being used for IIoT communications. Some of the base stations support wireless communications using a wideband signal. Base station 1 1602 supports wireless communications using unlicensed spectrum with a 20 MHz bandwidth part (BWP), while base station M 1604 supports wireless communications using unlicensed spectrum with a wideband 100 MHz BWP. Exemplary communications system 100 further includes a plurality of user equipments (UEs) (UE 1 1612, UE 2 1614, UE 3 1616, UE 4 1618, UE 5 1620, UE 6 1622, UE 7 1624, . . . , UE n 1626. The plurality of UEs may, and sometimes does, include a mixture of UEs with different reliability and/or latency requirements. Resources previously allocated to a UE, e.g., a first UE, with relatively low priority, may be cancelled via cancellation indication (communicated in DCI messages) and the resources may be re-allocated to one or more higher priority UEs. Some of the UEs are mobile devices which may move throughout the system, while other ones of the UEs are stationary devices. Different UEs may, and sometimes do, have different classifications with regard to priority, which is used to determine which UL resources are to be cancelled. In some embodiments, the priority level associated with a UE may, and sometimes does change, e.g. dynamically over time, e.g. in response to its current traffic needs. Exemplary system 100 supports the communication of uplink cancellation indication for type 2 allocation UL resources (interlaced) such as interlaced PUSCH and interlaced PUCCH, e.g., using a more efficient format, e.g. less bits to communicated frequency cancellation information than the format used for non-interlaced.

Figure 17:
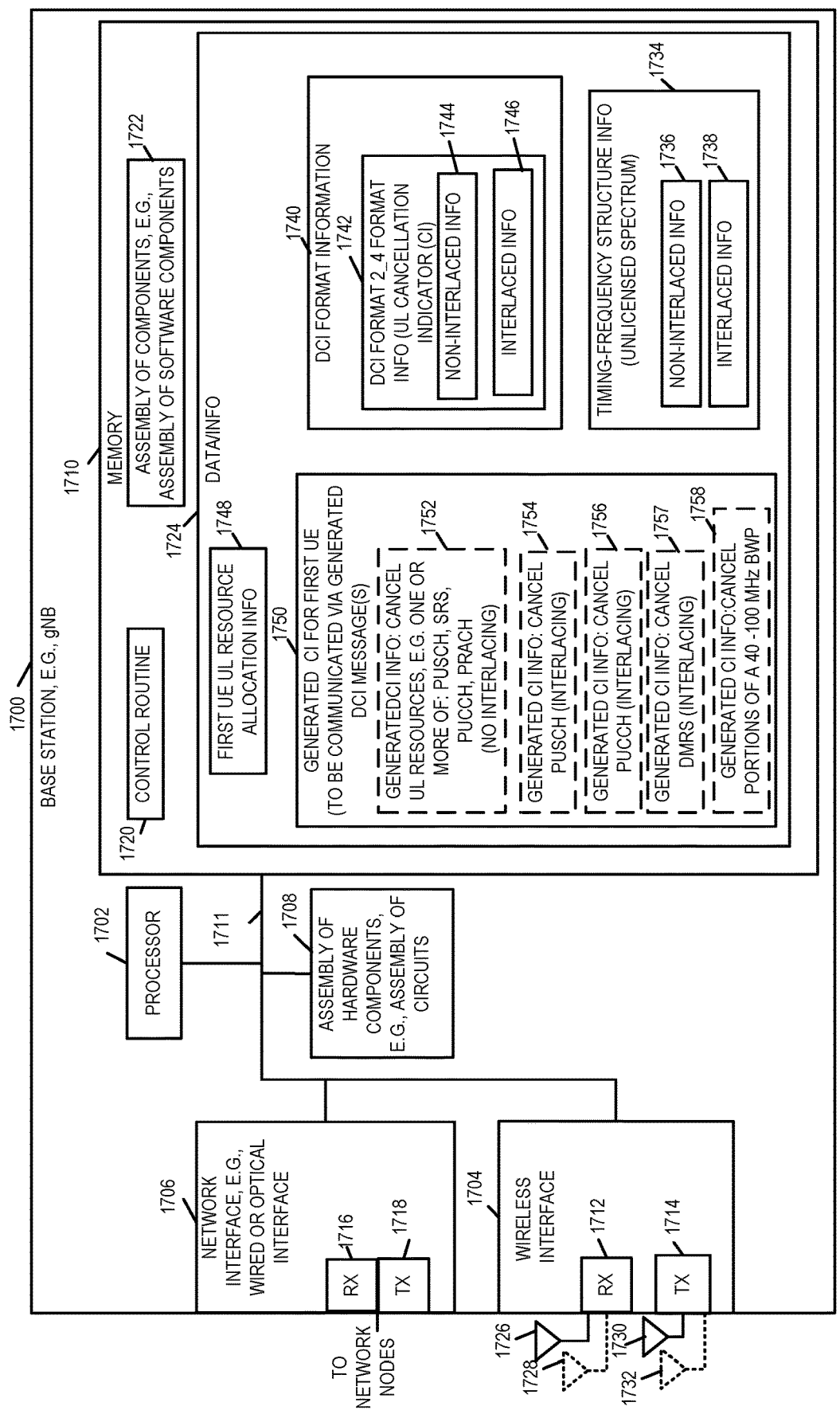
FIG. 17 is a drawing of an exemplary base station, e.g. a gNB, in accordance with an exemplary embodiment.

FIG. 17 is a drawing of an exemplary base station 1700, e.g. a gNB, in accordance with an exemplary embodiment. Exemplary base station 1700 is, e.g. one of the base stations (1602, . . . , 1604) of system 1600 of FIG. 16, and/or a base station implementing steps of the method of flowchart 500 of FIG. 5, and/or a base station implements operations corresponding to operation performs by a base station interacting with the UE implementing the steps of method 1500 of FIG. 15.

Exemplary base station 1700 includes a processor 1702, a wireless interface 1704, a network interface 1706, e.g. a wired or optical interface, an assembly of hardware components 1708, e.g., assembly of circuits, and memory 1710, coupled together via a bus 1711 over which the various elements may interchange data and information. Network interface 1706 includes a receiver 1716 and transmitter 1718, via which the base station 1700 is coupled to a backhaul network, other network nodes and/or the Internet. Wireless interface 1704 includes a wireless receiver 1712 coupled to one or more antennas or antenna elements (1726, . . . , 1728), via which the base station may receive wireless signals, e.g., PDSCH signals, PUCCH channel signals, PRACH signals, SRS channel signals, and PUCCH channel signals, using unlicensed spectrum from UEs, and a wireless transmitter 1714 coupled to one or more antennas or antenna elements (1730, . . . , 732)), via which the base station may transmit wireless signals, e.g., said wireless signals including DCI messages including cancellation indications (CIs) for UEs, said cancellation indications including a CI using a different format for PUSCH resources which have interlacing allocation than PUSCH resource with a non-interlacing allocation.

Memory includes a control routine 1720, an assembly of component 1722, e.g. an assembly of software components, e.g. software routines, modules and/or APPs, e.g. for implementing steps of a method, e.g. steps of the method of flowchart 500 of FIG. 5 performed by a base station, and data/information 1724. Data/information 1724 includes timing-frequency structure information for unlicensed spectrum 1734 including non-interlaced information 1736 and interlaced information 1738. Data/information 1724 further includes DCI format information 1740, first UE resource allocation information 1748 and a generated CI for first UE 1750.

DCI format information 1740 includes DCI format 2_4 format information (UL cancellation indicator (CI) formation information) 1752, which includes non-interlaced information 1744, e.g. format(s) to be used for sending CI for non-interlaced UL resources, and interlaced information 1746, e.g. format(s) to be used for sending CI for interlaced UL resources. Non-interlaced CI format is different from the interlaced CI format. Depending upon the number of interlaces used corresponding to a particular resource type to be cancelled, there may be and sometimes are different interlaced CI formats. There may be, and sometimes are different interlaced CI formats as a function of SCS, e.g. a first format for CI for M=5 indices for cancelling interlaced PUSCH with 30 kHz SCS, and a second format for CI for M=10 indices for cancelling interlaced PUSCH with 15 kHz SCS.

Generated CI 1759 for first UE (to be communicated via generated DCI messages(s)) includes, e.g., one or more of: generated CI information 1752 for cancelling UL resources, e.g. one or more of PUSCH, SRS, PUCCH, or PRACH resources (which are non-interlaced resources), generated CI information 1754 for cancelling PUSCH resources (which are interlaced resources), generated CI information 1756 for cancelling PUCCH resources (which are interlaced resources), generated CI information 1757 for cancelling DMRS resources (which are interlaced resources), and generated CI 1758 information for cancelling portions of a 40-100 MHz BWP.

Figure 18:
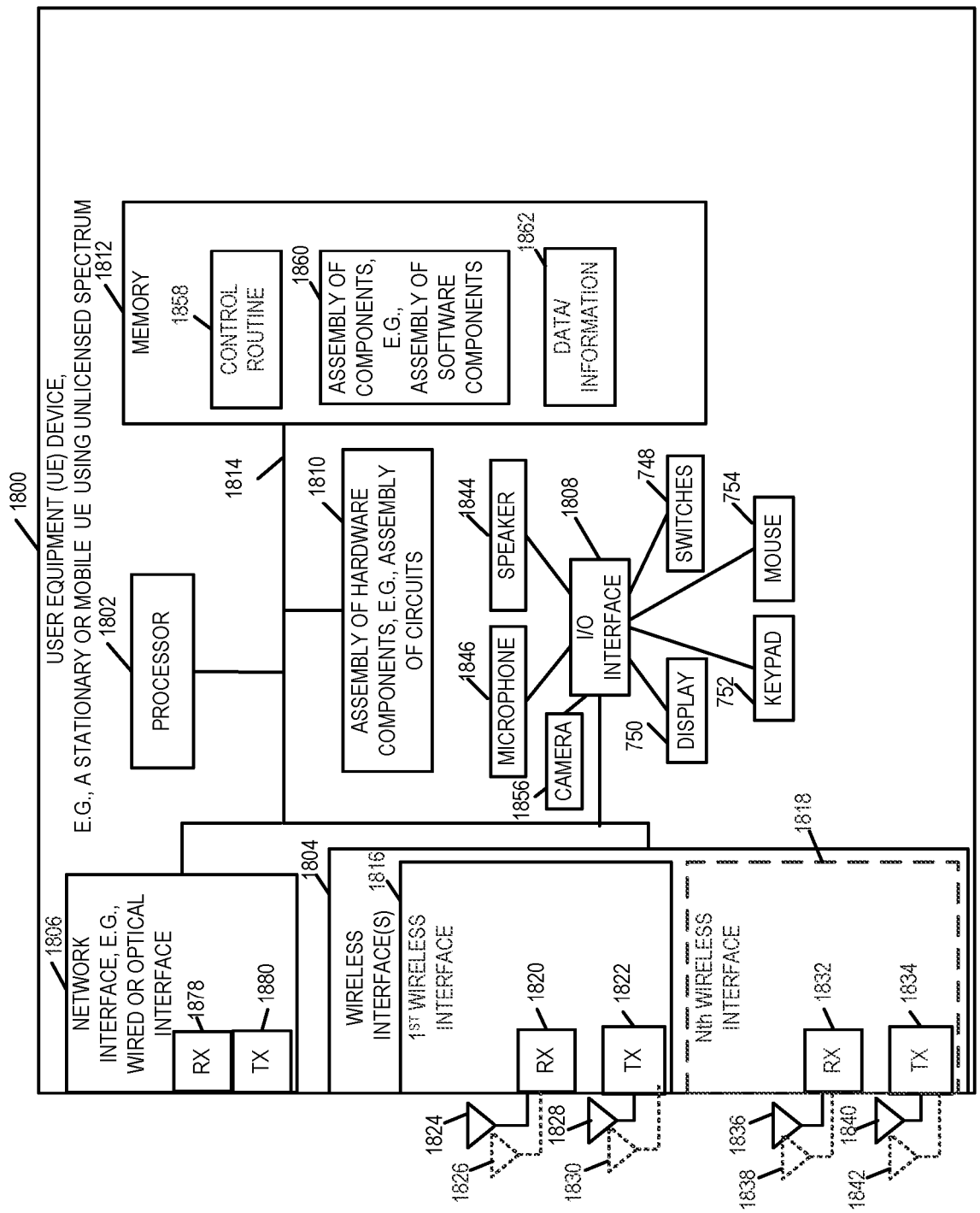
FIG. 18 is a drawing of an exemplary user equipment (UE) device in accordance with an exemplary embodiment.

FIG. 18 is a drawing of an exemplary user equipment (UE) device in accordance with an exemplary embodiment. Exemplary UE 1800 is, e.g. one of the UEs of system 1600 of FIG. 16, and/or a UE implementing steps of the method of flowchart 500 of FIG. 5 and/or steps of the method of flowchart 1500 of FIG. 15. Exemplary UE 1800 includes a processor 1802, e.g., a CPU, wireless interface(s) 1804, a network interface 1806, an I/O interface 1808, an assembly of hardware components 1810, e.g., assembly of circuits, and memory 1812, coupled together via a bus 1814 over which the various elements may interchange data and information.

Wireless interface(s) 1804 includes one or more wireless interfaces including a first wireless interface 1816 and optionally, a second wireless interface 1818. First wireless interface 1816 includes a wireless receiver 1820 coupled to one or more antennas or antenna elements (1824, . . . , 1826) via which the UE 1800 can receive wireless signals, e.g. from a base station. First wireless interface 1816 further includes a wireless transmitter 1822 coupled to one or more antennas or antenna elements (1828, . . . , 1830) via which the UE 1800 can transmit wireless signals to a base station.

Second wireless interface 1818, includes a wireless receiver 1832 coupled to one or more antennas or antenna elements (1836, . . . , 1838) via which the UE 1800 can receive wireless signals, e.g. from a base station. Second wireless interface 1818 further includes a wireless transmitter 1834 coupled to one or more antennas or antenna elements (1840, . . . , 1842) via which the UE 1800 can transmit wireless signals, e.g. to a base station.

Network interface 1806, e.g. a wired or optical interface, includes a receiver 1878 and a transmitter 1880 via which the UE 1800 can receive and send signals when the UE is coupled to network devices via a wired or optical link, e.g. at a fixed location.

UE device further includes a plurality of user input output devices (speaker 1844, microphone 1846, switches 1848, mouse 1854, keypad 1852, display 1850, e.g. a touch screen display, and camera 1856, which are coupled to I/O interface 1808, which couples the various I/O devices to bus 1814 and to other elements within UE 1800.

Memory 1812 includes a control routine 1858, an assembly of components 1860, e.g. assembly of software components, and data/information 1862. Data/information 1862 includes a received grant for uplink resources, and a received cancellation indication (CI) for previously allocated UL resources.

Figure 19:
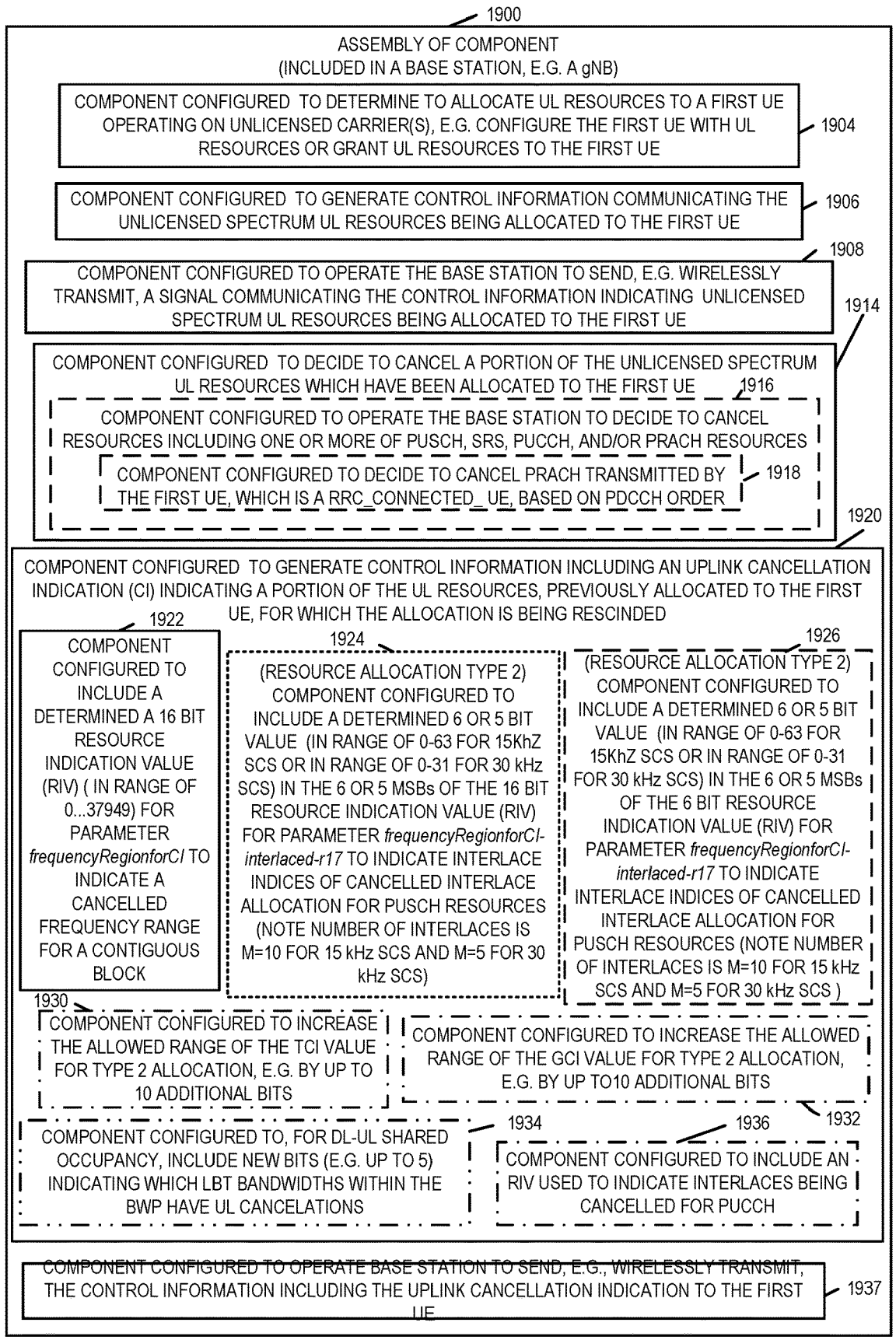
FIG. 19 is a drawing of an exemplary assembly of components which may be included in a base station in accordance with an exemplary embodiment.

FIG. 19 is a drawing of an exemplary assembly of components 1900 which may be included in a base station, e.g., gNB, in accordance with an exemplary embodiment. Assembly of components 1900 is, e.g., included in any of base stations (1602, . . . , 1604) of system 1600 of FIG. 16, base station 1700 of FIG. 17, a base station implementing steps of the method of flowchart 500 of FIG. 5, and/or a base station interacting with a UE implementing steps of flowchart 1500 of FIG. 15.

The components in the assembly of components 1900 can, and in some embodiments are, implemented fully in hardware within a processor, e.g., processor 1702, e.g., as individual circuits. The components in the assembly of components 1900 can, and in some embodiments are, implemented fully in hardware within the assembly of hardware components 1708, e.g., as individual circuits corresponding to the different components. In other embodiments some of the components are implemented, e.g., as circuits, within processor 1702 with other components being implemented, e.g., as circuits within assembly of components 1708, external to and coupled to the processor 1702. As should be appreciated the level of integration of components on the processor and/or with some components being external to the processor may be one of design choice. Alternatively, rather than being implemented as circuits, all or some of the components may be implemented in software and stored in the memory 1710 of the base station 1700, with the components controlling operation of the base station to implement the functions corresponding to the components when the components are executed by a processor e.g., processor 1702. In some such embodiments, the assembly of components 1900 is included in the memory 1710 as part of assembly of software components 1722. In still other embodiments, various components in assembly of components 1900 are implemented as a combination of hardware and software, e.g., with another circuit external to the processor providing input to the processor which then under software control operates to perform a portion of a component's function.

When implemented in software the components include code, which when executed by a processor, e.g., processor 1702, configure the processor to implement the function corresponding to the component. In embodiments where the assembly of components 1900 is stored in the memory 1710, the memory 1710 is a computer program product comprising a computer readable medium comprising code, e.g., individual code for each component, for causing at least one computer, e.g., processor 1702, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 19 control and/or configure the base station 1700 or elements therein such as the processor 1702, to perform the functions of corresponding steps illustrated and/or described in the method of one or more of the flowcharts, signaling diagrams and/or described with respect to any of the Figures. Thus, the assembly of components 1900 includes various components that perform functions of corresponding one or more described and/or illustrated steps of an exemplary method, e.g., steps of the method of flowchart 500 of FIG. 5.

Assembly of components 1900 includes a component 1904 configured to determine to allocate UL resources to a first UE operating on unlicensed carrier(s), e.g., configure the first UE with UL resources or grand UL resources to the first UE, a component 1906 configured to generate control information communicating the unlicensed spectrum UL resources being allocated to the first UE, a component 1908 configured to operate the base station to send, e.g. wirelessly transmit, a signal communicating the control information indicating unlicensed spectrum UL resources which have been allocated to the first UE.

Assembly of components 1914 further includes a component 1914 configured to decide to cancel a portion of the unlicensed spectrum UL resources which have been allocated to the first UE. Component 1914 includes a component 1916 configured to decide to cancel resources including one or more of PUSCH, SRS, PUCCH, and/or PRACH resources. In some embodiments component 1916 includes a component 1918 configured to decide to cancel PRACH transmitted by the first UE, which is a radio resource control (RRC) connected UE, based on PDCCH order. In some embodiments, a decision is made to cancel PRACH or PUCCH resources previously allocated to the first UE in order to reduce interference or collisions with respect to other higher priority UEs transmitting or potentially transmitting signals, e.g. on adjacent resources or common resources, and/or to increase the likelihood that LBT performed by a higher priority UE will determine that the channel is clear. In some embodiments, a decision is made to cancel PUSCH resources previously allocated to the first UE in order to make those PUSCH resources available to be used by a higher priority UE, e.g. an IIoT UE which requires ultra reliable low latency communications (URLLC).

Assembly of components 1900 further includes a component 1920 configured to generate control information including UL cancellation information, e.g. an UL cancellation indication (CI) message, indicating a portion of the UL resources, previously allocated to the first UE, for which the allocation is being rescinded. Component 1920 includes one or more or all of components 1922, 1924, 1926, 1930, 1932, 1934, 1936. Component 1922 is a component configured to include a determined 16 bit resource indication value (RIV) (e.g., in the range of 0 . . . 37949) for the parameter frequencyRegionforCI to indicate a cancelled frequency range for a contiguous block. Component 1924 is a component configured to include a determined 6 or 5 bit value (e.g., in the range of 0 . . . 63 for 15 kHz sub-carrier spacing (SCS) or in the range of 0 . . . 31 for 30 kHz SCS) in the 6 or 5 most significant bits (MSBs) of the 16 bit resource indication value (RIV) for parameter frequencyRegionforCI-interlaced-r17 to indicate interlace indices of cancelled interlace allocation for PUSCH resources. (Note the number of interlaces is M=10 for 15 kHz SCS and M=5 for 30 kHz SCS.) Component 1922 is a component configured to include a determined 16 bit resource indication value (RIV) (e.g., in the range of 0 . . . 37949) for the parameter frequencyRegionforCI to indicate a cancelled frequency range for a contiguous block. Component 1926 is a component configured to include a determined 6 or 5 bit value (e.g., in the range of 0 . . . 63 for 15 kHz SCS or in the range of 0 . . . 31 for 30 kHz SCS) in the 6 or 5 MSBs of the 6 bit resource indication value (RIV) for parameter frequencyRegionforCI-interlaced-r17 to indicate interlace indices of cancelled interlace allocation for PUSCH resources. (Note the number of interlaces is M=10 for 15 kHz SCS and M=5 for 30 kHz SCS.) Component 1922 is used for communicating cancellation indication (CI) for resources corresponding to a non-interlaced allocation, while component 1924 or 1926 is used for communicating cancellation indication (CI) for PUSCH resources corresponding to a resource allocation type 2 (interlaced resource allocation). Modified version(s) of components 1924 and/or 1926 may be, and sometimes are, (designated as component 1936) included and also used for cancellation of PUCCH resources (with interlacing), but with the number of bits used for the RIV for determining frequency being different, e.g. less since the number of interlaces is smaller, e.g. M=2 interlaces for PUCCH. Component 1920 also determines a RIV for a granularity parameter GCI, and may also determine a RIV for a time parameter TCI, corresponding to a determined frequency information, determined by component 1922, 1924 or 1926. Component 1920 further includes a component 1930 configured to increase the allowed range of the TCI value for type 2 allocation, e.g. by up to 10 additional bits and a component 1932 component 1930 configured to increase the allowed range of the GCI value for type 2 allocation, e.g. by up to 10 additional bits. Component 1934 is a component configured to, for DL-UL shared occupancy, include new bits (e.g. up to 5 new bits) indicating which LBT bandwidths within a wideband BWP have UL cancellation, and a component 1936 configured to include a RIV used to indicate interlaces being cancelled for PUCCH.

Assembly of components 1900 further includes a component 1937 configured to operate the base station to send, e.g. wirelessly transmit, the control information generated by component 1920, e.g., said control information including the cancellation indication (CI) in a DCI format, to the first UE.

Figure 20A:
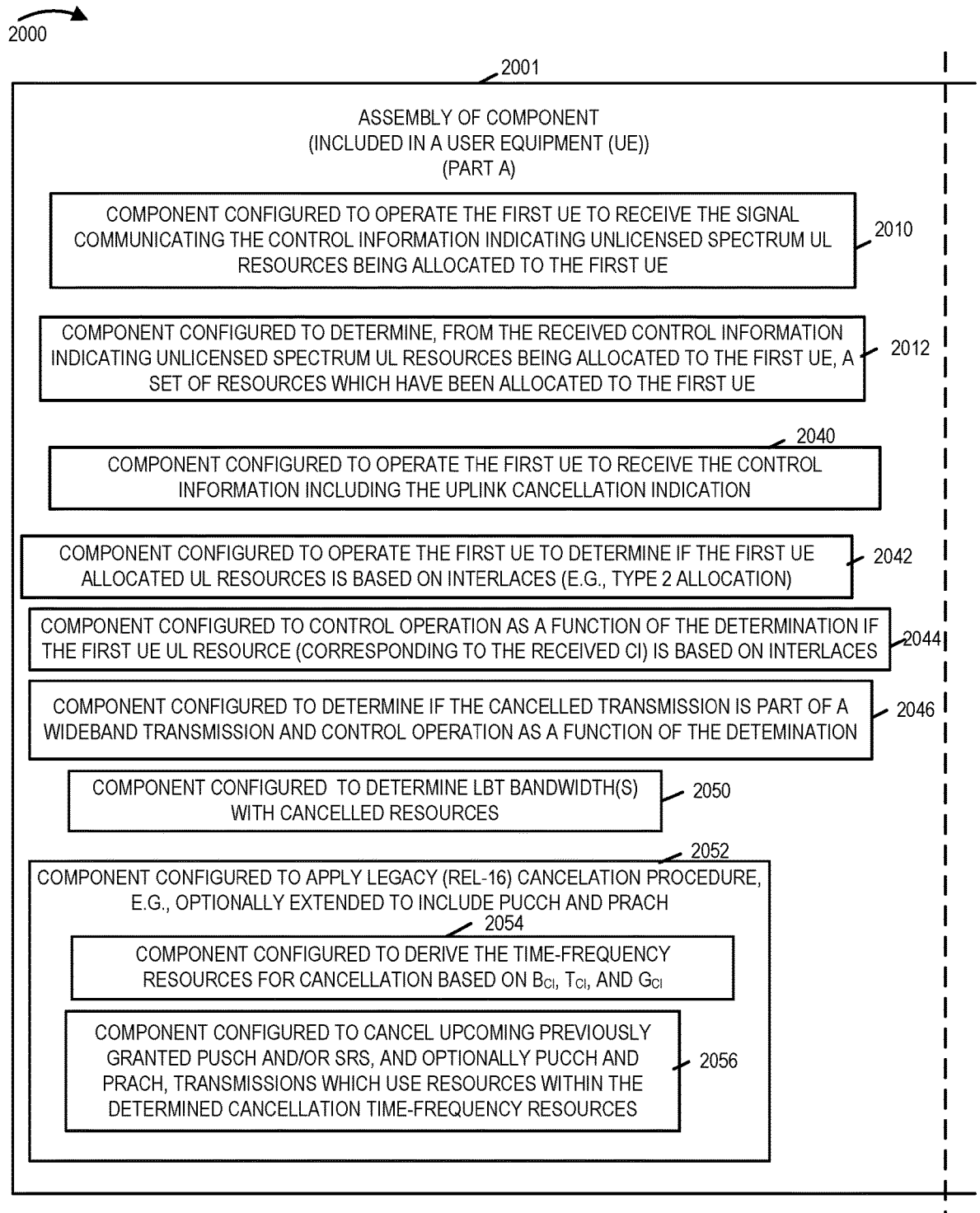
FIG. 20A is a first part of a drawing of an exemplary assembly of components which may be included in a user equipment (UE) device in accordance with an exemplary embodiment.
Figure 20B:
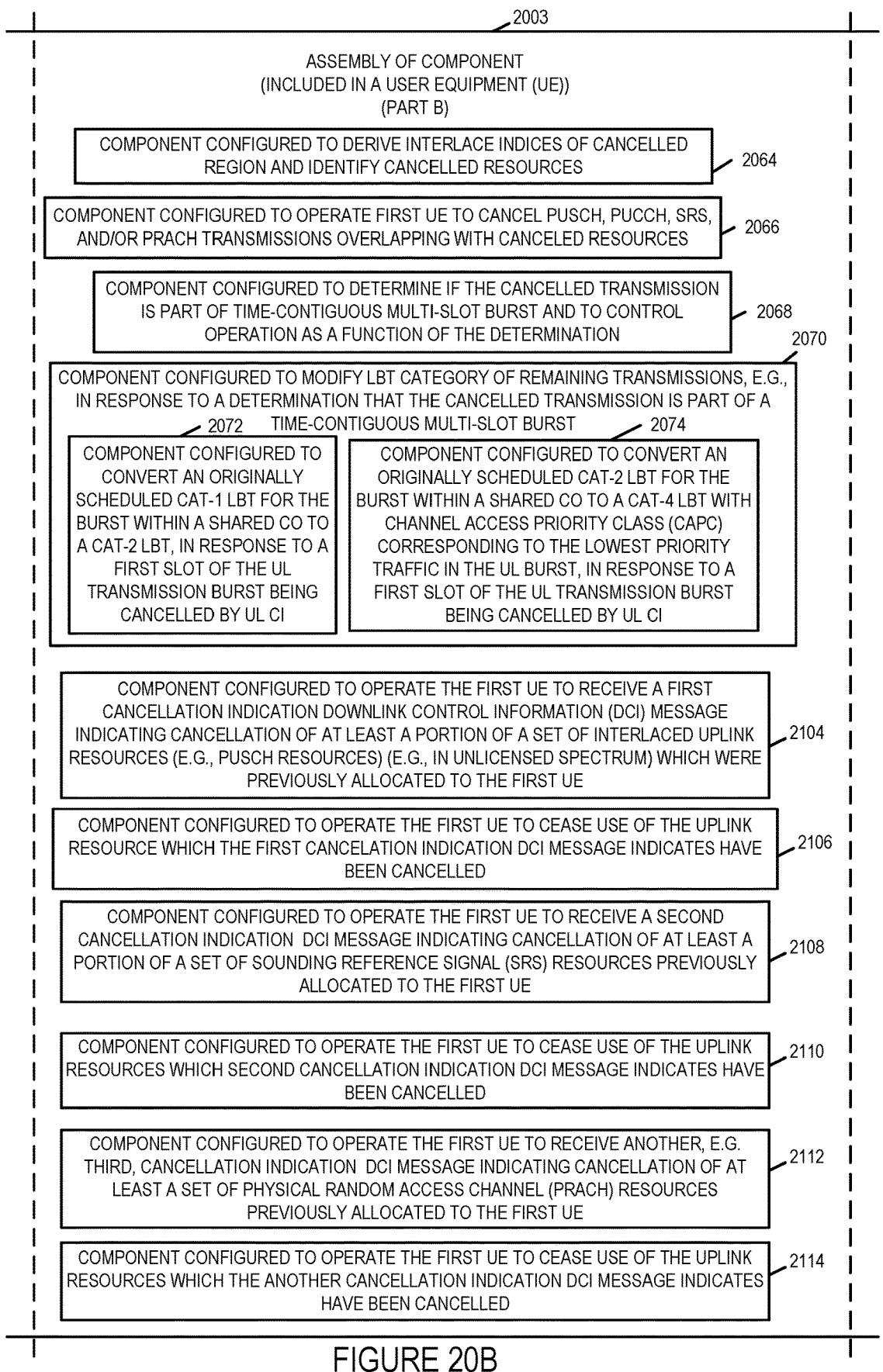
FIG. 20B is a second part of a drawing of an exemplary assembly of components which may be included in a user equipment (UE) device in accordance with an exemplary embodiment.
Figures 20, 20A, 20B, 20C:
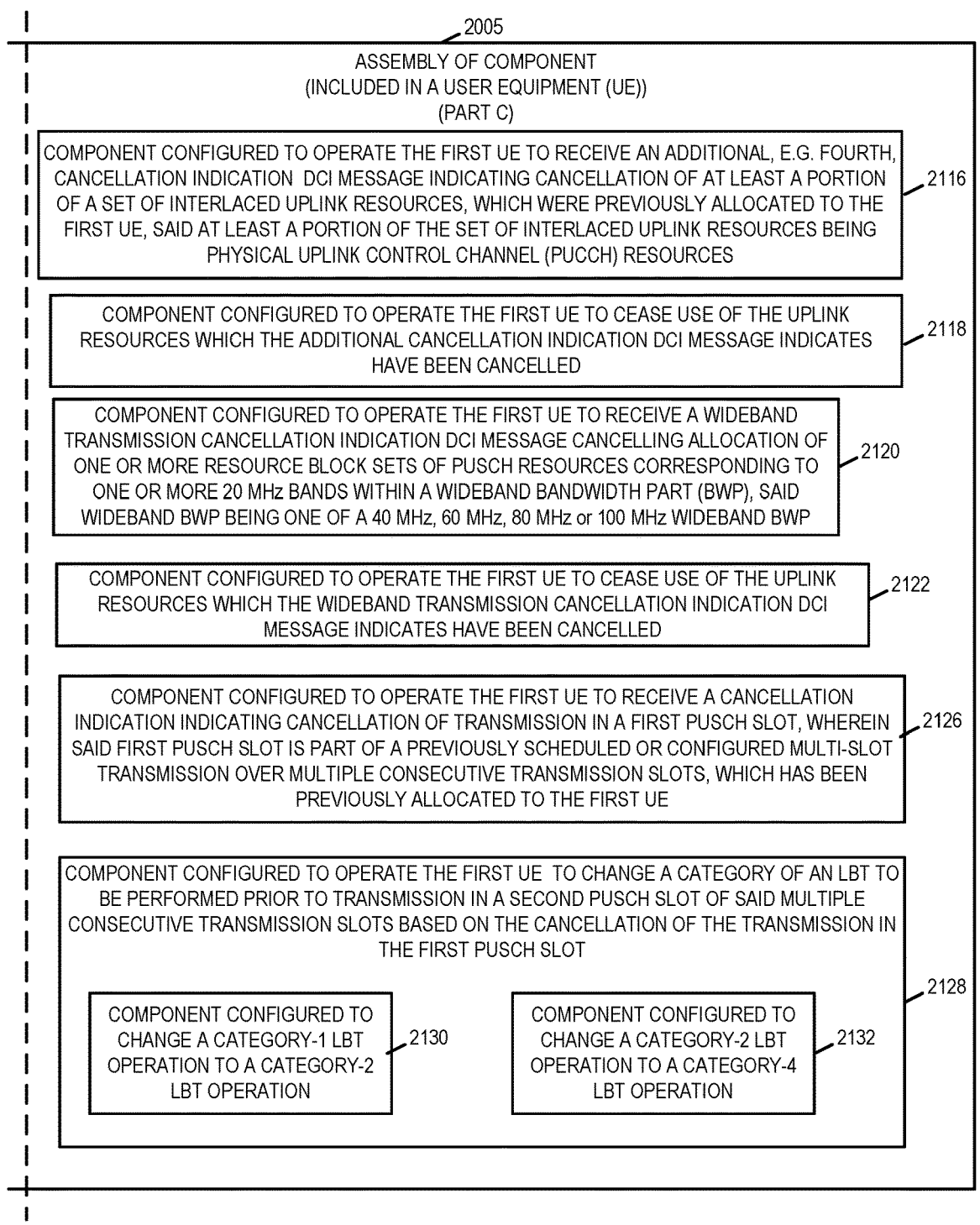
FIG. 20C is a third part of a drawing of an exemplary assembly of components which may be included in a user equipment (UE) device in accordance with an exemplary embodiment.
FIG. 20 comprises the combination of FIG. 20A, FIG. 20B and FIG. 20C.

FIG. 20, comprising the combination of FIG. 20A, FIG. 20B and FIG. 20C, is a drawing of an exemplary assembly of components 2000, comprising the combination of Part A 2001, Part B 2003 and Part C 2005, which may be included in a user equipment (UE) device in accordance with an exemplary embodiment. Assembly of components 2000 is, e.g., included in any of UEs (1612, 1614, 1616, 1618, 1620, 1622, ..., 1624) of system 1600 of FIG. 16, UE device 1800 of FIG. 18, a UE device implementing steps of the method of flowchart 500 of FIG. 5, and/or a UE device implementing steps of flowchart 1500 of FIG. 15.

The components in the assembly of components 2000 can, and in some embodiments are, implemented fully in hardware within a processor, e.g., processor 1802, e.g., as individual circuits. The components in the assembly of components 1900 can, and in some embodiments are, implemented fully in hardware within the assembly of hardware components 1810, e.g., as individual circuits corresponding to the different components. In other embodiments some of the components are implemented, e.g., as circuits, within processor 1802 with other components being implemented, e.g., as circuits within assembly of components 1810, external to and coupled to the processor 1802. As should be appreciated the level of integration of components on the processor and/or with some components being external to the processor may be one of design choice. Alternatively, rather than being implemented as circuits, all or some of the components may be implemented in software and stored in the memory 1812 of the UE device 1800, with the components controlling operation of the UE device to implement the functions corresponding to the components when the components are executed by a processor e.g., processor 1802. In some such embodiments, the assembly of components 2000 is included in the memory 1812 as part of assembly of software components 1860. In still other embodiments, various components in assembly of components 2000 are implemented as a combination of hardware and software, e.g., with another circuit external to the processor providing input to the processor which then under software control operates to perform a portion of a component's function.

When implemented in software the components include code, which when executed by a processor, e.g., processor 1802, configure the processor to implement the function corresponding to the component. In embodiments where the assembly of components 2000 is stored in the memory 1812, the memory 1812 is a computer program product comprising a computer readable medium comprising code, e.g., individual code for each component, for causing at least one computer, e.g., processor 1802, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 20 control and/or configure the UE 1800 or elements therein such as the processor 1802, to perform the functions of corresponding steps illustrated and/or described in the method of one or more of the flowcharts, signaling diagrams and/or described with respect to any of the Figures. Thus, the assembly of components 2000 includes various components that perform functions of corresponding one or more described and/or illustrated steps of an exemplary method, e.g., steps of the method of flowchart 500 of FIG. 5 and/or the method of flowchart 1500 of FIG. 15.

Assembly of components 2000 includes a component 2010 configured to operate the first UE to receive a signal communicating the control information indicating unlicensed spectrum UL resources being allocated to the first UE, a component 2012 configured to determine, form the received control information indicating unlicensed spectrum UL resources being allocated to the first UE, a set of resources which have been allocated to the first UE, a component 2040 configured to operate the first UE to receive the control information including uplink cancellation indication (CI), a component 2042 configured to determine if first UE allocated UL resources (corresponding to the received CI) is based on interlaces (e.g., type 2 allocation), a component 2044 configured to control operation as a function of the determination if the first UE UL resources (corresponding to the received CI) is based on interlaces, a component 2046 configured to determine if the cancelled transmission is part of a wideband transmission and control operation as a function of the determination, a component 2046 configured to determine LBT bandwidth(s) with cancelled resources, and a component 2050 configured to determine LBT bandwidth(s) with cancelled resources, based on the setting of indicator bits (e.g., up to 5), e.g., of a received LBT_bandwidth_PUSCH_cancellation_indicator, communicated in the cancellation indicator (CI) received from the base station.

Assembly of components 2000 further includes a component 2052 configured to apply legacy (e.g., Rel-16) cancellation procedure, e.g., the legacy cancellation procedure which has been optionally extended to include cancellation or PUCCH and/or PRACH resources. Component 2053 includes a component 2054 configured to derive the time-frequency resources for cancellation based on BCI, TCI and GCI, and a component 2056 configured to cancel upcoming previously granted PUSCH and/or SRS, and optionally PUCCH and PRACH, transmission which use resources within the determined cancellation region(s) corresponding to the received CI.

Assembly of components 2000 further includes a component 2064 configured to derive interlace indices of cancelled region and identified cancelled resources, a component 2066 configured to operate the first UE to cancel PUSCH, PUCCH, SRS, and/or PRACH transmissions overlapping with the cancelled resources, a component 2068 configured to determine if the cancelled transmission is part of a time-contiguous multi-slot burst and to control operation as a function of the determination. Assembly of components 2000 further includes a component 2070 configured to modify LBT category of remaining transmissions, e.g., in response to a determination that the cancelled transmission is part of time-contiguous multi-slot burst. Component 2070 includes a component 2072 configured to convert an originally scheduled CAT-1 LBT for the burst with a shared CO to a CAT-2 LBT, in response to a first slot of the UL transmission burst being cancelled by UL CI, and a component 2074 configured to convert an originally scheduled CAT-2 LBT for the burst with a shared CO to a CAT-4 LBT with channel access priority class (CACP) corresponding to the lowest priority traffic in the UL burst, in response to a first slot of the UL transmission burst being cancelled by UL CI.

Assembly of components 2000 further includes a component 2104 configured to operate the first UE to receive a first cancellation indication downlink control information (DCI) message indicating cancellation of at least a portion of a set of interlaced uplink resources (e.g., PUSCH resources) (e.g., in unlicensed spectrum) which were previously allocated to the first UE, a component 2106 configured to operate the first UE to cease use of the uplink resource (e.g., PUSCH interlaced resources) which the first cancellation indication DCI message indicates have been cancelled, a component 2109 configured to operate the first UE to receive a second cancellation indication DCI message indication cancellation of a least a portion of a set of sounding reference signal (SRS) resources previously allocated to the first UE, a component 2110 configured to operate the first UE to cease use of the uplink resources which the second cancellation indication DCI message indicates have been cancelled, a component 2112 configured to operate the first UE to receive another, e.g. third, cancellation indication DCI message indicating cancellation of a least a set of physical random access channel (PRACH) resources previously allocated to the first UE, a component 2114 configured to operate the first UE to cease use of the uplink resources which the another cancellation indication DCI message indicates have been cancelled. Assembly of components 2000 further includes a component 2116 configured to operate the first UE to receive an additional, e.g. fourth, cancellation indication DCI message indicating cancellation of at least a portion of a set of interlaced uplink resources which were previously allocated to the first UE, said at least a portion of the set of interlaced uplink resources being physical uplink control channel (PUCCH) resources, a component 2118 configured to operate the first UE to cease use of the uplink resources which the additional cancellation indication DCI message indicates have been cancelled, a component 2120 configured to operate the first UE to receive a wideband transmission cancellation indication DCI message cancelling allocation of one or more resource block sets of PUSCH resources corresponding to one or more 20 MHz bands within a wideband bandwidth part (BWP), said wideband BWP being one of a 40 MHz, 60 MHz, 80 MHz or 100 MHz wideband BWP, a component 2122 configured to operate the first UE to cease use of the uplink resources which the wideband transmission cancellation indication DCI message indicates have been cancelled, a component 2126 configured to operate the first UE to receive a cancellation indication indicating cancellation of transmission in a first PUSCH slot, wherein said first PUSCH slot is part of a previously scheduled or configured multi-slot transmission over multiple consecutive transmission slots, which have been previously allocated to the first UE, and a component 2128 configured to operate the first UE to change a category of an LBT to be performed prior to transmission in a second PUSCH slot of said multiple consecutive transmission slots based on the cancellation of the first slot. Component 2128 includes a component 2130 configured to change a category-1 LBT operation to a category-2 LBT operation, and a component 2132 configured to change a category-2 LBT operation to a category-4 LBT operation, e.g., with channel access priority class (CACP) corresponding to the lowest priority traffic in the UL burst.

The first UE (1612 or 1800) of claim 1, wherein said first UE uses unlicensed spectrum and said first cancellation indication DCI message indicates cancellation of unlicensed spectrum (e.g., IIoT unlicensed spectrum) communications resources.

In some embodiments, said first UE (e.g., UE 1612) is a UE with relatively low priority such that its resources may be cancelled and re-allocated to other higher priority UEs (1614, 1616).

In some embodiments, the first UE (e.g., UE 1612) is an Industrial Internet of Things (IIoT) device.

In some embodiments, the first cancellation indication DCI message includes less bits for communicating time and frequency resource information than the second cancellation indication DCI message (e.g., with regard to CI sent to the first UE).

In various embodiments, the second cancellation indication DCI message cancels a contiguous block of SRS resources.

In some embodiments, the first cancellation indication DCI message includes a resource indicator value (RIV), used to communicate frequency region cancellation information, having less bits than a RIV, used to communicate frequency region cancellation information, included in the second cancellation indication DCI message.

In some embodiments, the first cancellation indication DCI message includes 6 bits for the RIV value used to communicate frequency region cancellation information. In some such embodiments, the second cancellation indication DCI message includes 16 bits for the RIV value used to communicate frequency region cancellation information.

In some embodiments, the second cancellation indication DCI message includes less bits for the field used to communicate time granularity information (GCI), than the first cancellation indication DCI message.

In some embodiments, the second cancellation indication DCI message includes less bits for the field used to communicate time information (TCI), than the first cancellation indication DCI message.

In various embodiments, the another cancellation indication DCI message cancels a contiguous block of PRACH resources.

In some embodiments, the wideband transmission cancellation indication DCI message includes a listen-before-talk (LBT) bandwidth PUSCH indicator indicating which ones of the one or more 20 MHz bands in the wideband PUSCH resources allocated to the first UE are being canceled. In some embodiments, the LBT bandwidth PUSCH indicator includes 2 to 5 bits, said number of bits being a function of the width of the wideband PUSCH resource allocated to the first UE.

Numbered List of Exemplary Method Embodiments

Method Embodiment 1 A method of operating a first user equipment device (e.g., UE), the method comprising: receiving (1504) a first cancellation indication downlink control information (DCI) message indicating cancellation of at least a portion of a set of interlaced uplink resources which were previously allocated to the first UE; and operating (1506) the first UE to cease use of the uplink resources which the first cancellation indication DCI message indicates have been canceled.

Method Embodiment 1A The method of Method Embodiment 1, wherein said first UE uses unlicensed spectrum and said first cancellation indication DCI message indicates cancellation of unlicensed spectrum (e.g., IIoT unlicensed spectrum) communications resources.

Method Embodiment 1B The method of Method Embodiment 1A, wherein said first UE is a UE with a first priority such that its resources will be cancelled and re-allocated to one or more UEs having a higher priority, e.g. second priority, which is higher than said first priority.

Method Embodiment 1C The method of Method Embodiment 1A, wherein said first UE is a UE with relatively low priority such that its resources may be cancelled and re-allocated to other higher priority UEs.

Method Embodiment 1D The method of Method Embodiment 1A, wherein the first UE is an Industrial Internet of Things (IIoT) device.

Method Embodiment 2 The method of Method Embodiment 1 wherein said first cancellation indication DCI message cancels Physical Uplink Shared Channel (PUSCH) resources.

Method Embodiment 3 The method of Method Embodiment 1, further comprising: receiving (1508) a second cancellation indication DCI message indicating cancellation of a set of SRS (Sounding Reference Signal) resources previously allocated to the first UE; and operating (1510) the first UE to cease use of the uplink resources which the second cancellation indication DCI message indicates have been canceled.

Method Embodiment 3A The method of Method Embodiment 3, wherein the first cancellation indication DCI message includes less bits for communicating time and frequency resource information than the second cancellation indication DCI message (e.g., with regard to CI sent to the first UE).

Method Embodiment 3B The method of Method Embodiment 3 where the second cancellation indication DCI message cancels a contiguous block of SRS resources.

Method Embodiment 4 The method of Method Embodiment 3, wherein the first cancellation indication DCI message includes a resource indicator value (RIV), used to communicate frequency region cancellation information, having less bits than a RIV, used to communicate frequency region cancellation information, included in the second cancellation indication DCI message.

Method Embodiment 4A The method of Method Embodiment 4, wherein the first cancellation indication DCI message includes 6 bits for the RIV value used to communicate frequency region cancellation information.

Method Embodiment 4B The method of Method Embodiment 4A, wherein the second cancellation indication DCI message includes 16 bits for the RIV value used to communicate frequency region cancellation information.

Method Embodiment 4C The method of Method Embodiment 4, wherein the second cancellation indication DCI message includes less bits for the field used to communicate time granularity information (GCI), than the first cancellation indication DCI message.

Method Embodiment 4D The method of Method Embodiment 4, wherein the second cancellation indication DCI message includes less bits for the field used to communicate time information (TCI), than the first cancellation indication DCI message.

Method Embodiment 5 The method of Method Embodiment 1 or 3, further comprising: receiving (1512) another (e.g., third) cancellation indication DCI message indicating cancellation of a set of Physical Random Access Channel (PRACH) resources previously allocated to the first UE; and operating (1514) the first UE to cease use of the uplink resources which the another cancellation indication DCI message indicates have been canceled.

Method Embodiment 5A The method of Method Embodiment 3 where the another cancellation indication DCI message cancels a contiguous block of PRACH resources.

Method Embodiment 6 The method of Method Embodiment 1, further comprising: receiving (1520) a wideband transmission cancellation indication DCI message canceling allocation of one or more resource block sets of PUSCH resources corresponding to one or more 20 MHz bands within a wideband bandwidth part (BWP), said wideband BWP being one of 40 MHz, 60 MHz, 80 MHz or 100 MHz wideband BWP.

Method Embodiment 7 The method of Method Embodiment 6, wherein the wideband transmission cancellation indication DCI message includes an listen-before-talk (LBT) bandwidth PUSCH indicator indicating which ones of the one or more 20 MHz bands in the wideband PUSCH resources allocated to the first UE are being canceled.

Method Embodiment 8 The method of Method Embodiment 7, where the LBT bandwidth PUSCH indicator includes 2 to 5 bits, said number of bits being a function of the width of the wideband PUSCH resource allocated to the first UE.

Method Embodiment 9 The method of Method Embodiment 1, wherein the first UE has been scheduled or configured to use a multi-slot PUSCH transmission over multiple consecutive transmission slots; and wherein the method further comprises: receiving (1526), at the first UE, a cancellation indication indicating cancellation of transmission in a first PUSCH slot in said multiple consecutive transmission slots.

Method Embodiment 10 The method of Method Embodiment 9, wherein the UE changes (1528) a category of an LBT to be performed prior to transmission in a second PUSCH slot of said multiple consecutive transmission slots based on the cancellation of the transmission in the first PUSCH slot.

Method Embodiment 10A The method of Method Embodiment 10, wherein said change (1528) of the LBT to be performed prior to transmission in the second PUSCH slot of said multiple consecutive transmission slots is a change (1530) from a category 1 LBT operation to category 2 LBT operation.

Method Embodiment 10B The method of Method Embodiment 10, wherein said change (1528) of the LBT to be performed prior to transmission in the second PUSCH slot of said multiple consecutive transmission slots is a change (1532) from a category 2 LBT operation to category 4 LBT operation.

Method Embodiment 11 The method of Method Embodiment 1 further comprising: receiving (1516) an additional cancellation indication downlink control information (DCI) message indicating cancellation of at least a portion of a set of interlaced uplink resources which were previously allocated to the first UE, said portion of the set of interlaced uplink resources being physical uplink control channel (PUCCH) resources; and operating (1518) the first UE to cease use of the uplink resources which the additional cancellation indication DCI message indicates have been canceled.

Numbered List of Exemplary Apparatus Embodiments

Apparatus Embodiment 1 A first user equipment (UE) (1612 or 1800) comprising: a wireless receiver (1820); and a processor (1802) configured to: operate the wireless receiver (1802) to: receive (1504) a first cancellation indication downlink control information (DCI) message indicating cancellation of at least a portion of a set of interlaced uplink resources which were previously allocated to the first UE; and operate (1506) the first UE to cease use of the uplink resources which the first cancellation indication DCI message indicates have been canceled.

Apparatus Embodiment 1A The first UE (1612 or 1800) of Apparatus Embodiment 1, wherein said first UE uses unlicensed spectrum and said first cancellation indication DCI message indicates cancellation of unlicensed spectrum (e.g., IIoT unlicensed spectrum) communications resources.

Apparatus Embodiment 1B The first UE (1612 or 1800) of Apparatus Embodiment 1A, wherein said first UE is a UE with a first priority such that its resources will be cancelled and re-allocated to one or more UEs (1614, 1616) having a higher priority, e.g. second priority, which is higher than said first priority.

Apparatus Embodiment 1C The first UE (1612 or 1800) of Apparatus Embodiment 1A, wherein said first UE is a UE with relatively low priority such that its resources may be cancelled and re-allocated to other higher priority UEs (1614, 1616).

Apparatus Embodiment 1D The first UE (1612 or 1800) of Apparatus Embodiment 1A, wherein the first UE is an Industrial Internet of Things (IIoT) device.

Apparatus Embodiment 2 The first UE (1612 or 1800) of Apparatus Embodiment 1 wherein said first cancellation indication DCI message cancels Physical Uplink Shared Channel (PUSCH) resources.

Apparatus Embodiment 3 The first UE (1612 or 1800) of Apparatus Embodiment 1, wherein said processor (1602) is further configured to: operate the first receiver (1820) to receive (1508) a second cancellation indication DCI message indicating cancellation of a set of SRS (Sounding Reference Signal) resources previously allocated to the first UE; and operate (1510) the first UE to cease use of the uplink resources which the second cancellation indication DCI message indicates have been canceled.

Apparatus Embodiment 3A The first UE (1612 or 1800) of Apparatus Embodiment 3, wherein the first cancellation indication DCI message includes less bits for communicating time and frequency resource information than the second cancellation indication DCI message (e.g., with regard to CI sent to the first UE).

Apparatus Embodiment 3B The first UE (1612 or 1800) of Apparatus Embodiment 3 where the second cancellation indication DCI message cancels a contiguous block of SRS resources.

Apparatus Embodiment 4 The first UE (1612 or 1800) of Apparatus Embodiment 3, wherein the first cancellation indication DCI message includes a resource indicator value (RIV), used to communicate frequency region cancellation information, having less bits than a RIV, used to communicate frequency region cancellation information, included in the second cancellation indication DCI message.

Apparatus Embodiment 4A The first UE (1612 or 1800) of Apparatus Embodiment 4, wherein the first cancellation indication DCI message includes 6 bits for the RIV value used to communicate frequency region cancellation information.

Apparatus Embodiment 4B The first UE (1612 or 1800) of Apparatus Embodiment 4A, wherein the second cancellation indication DCI message includes 16 bits for the RIV value used to communicate frequency region cancellation information.

Apparatus Embodiment 4C The first UE (1612 or 1800) of Apparatus Embodiment 4, wherein the second cancellation indication DCI message includes less bits for the field used to communicate time granularity information (GCI), than the first cancellation indication DCI message.

Apparatus Embodiment 4D The first UE (1612 or 1800) of Apparatus Embodiment 4, wherein the second cancellation indication DCI message includes more less for the field used to communicate time information (TCI), than the first cancellation indication DCI message.

Apparatus Embodiment 5 The first UE (1612 or 1800) of Apparatus Embodiment 1 or 3, wherein said processor is further configured to: operate the wireless receiver (1820) to receive (1512) another (e.g., third) cancellation indication DCI message indicating cancellation of a set of Physical Random Access Channel (PRACH) resources previously allocated to the first UE; and operate (1514) the first UE to cease use of the uplink resources which the another cancellation indication DCI message indicates have been canceled.

Apparatus Embodiment 5A The first UE (1612 or 1800) of Apparatus Embodiment 3 where the another cancellation indication DCI message cancels a contiguous block of PRACH resources.

Apparatus Embodiment 6 The first UE (1612 or 1800) of Apparatus Embodiment 1, wherein said processor (1802) is further configured to: operate the wireless receiver to receive (1520) a wideband transmission cancellation indication DCI message canceling allocation of one or more resource block sets of PUSCH resources corresponding to one or more 20 MHz bands within a wideband bandwidth part (BWP), said wideband BWP being one of 40 MHz, 60 MHz, 80 MHz or 100 MHz wideband BWP.

Apparatus Embodiment 7 The first UE (1612 or 1800) of Apparatus Embodiment 6, wherein the wideband transmission cancellation indication DCI message includes an listen-before-talk (LBT) bandwidth PUSCH indicator indicating which ones of the one or more 20 MHz bands in the wideband PUSCH resources allocated to the first UE are being canceled.

Apparatus Embodiment 8 The first UE (1612 or 1800) of Apparatus Embodiment 7, where the LBT bandwidth PUSCH indicator includes 2 to 5 bits, said number of bits being a function of the width of the wideband PUSCH resource allocated to the first UE.

Apparatus Embodiment 9 The first UE (1612 or 1800) of Apparatus Embodiment 1, wherein the first UE has been scheduled or configured to use a multi-slot PUSCH transmission over multiple consecutive transmission slots; and wherein said processor (1802) is further configured to: operate the wireless receiver to receive (1526) a cancellation indication indicating cancellation of transmission in a first PUSCH slot in said multiple consecutive transmission slots.

Apparatus Embodiment 10 The first UE (1612 or 1800) of Apparatus Embodiment 9, wherein said processor (1802) is further configured to change (1528) a category of an LBT to be performed prior to transmission in a second PUSCH slot of said multiple consecutive transmission slots based on the cancellation of the transmission in the first PUSCH slot.

Apparatus Embodiment 10A The first UE (1612 or 1800) of Apparatus Embodiment 10, wherein said processor (1802) is configured to: change (1530) from a category 1 LBT operation to category 2 LBT operation, as part of being configured to change (1528) the category of the LBT to be performed prior to transmission in the second PUSCH slot of said multiple consecutive transmission slots.

Apparatus Embodiment 10B The first UE (1612 or 1800) of Apparatus Embodiment 10, wherein said processor (1802) is configured to: change (1532) from a category 2 LBT operation to category 4 LBT operation, as part of being configured to change (1528) the category of the LBT to be performed prior to transmission in the second PUSCH slot of said multiple consecutive transmission slots.

Apparatus Embodiment 11 The first UE (1612 or 1800) of Apparatus Embodiment 1 wherein said processor (1802) is further configured to: operate the wireless receiver to receive (1516) an additional cancellation indication downlink control information (DCI) message indicating cancellation of at least a portion of a set of interlaced uplink resources which were previously allocated to the first UE, said portion of the set of interlaced uplink resources being physical uplink control channel (PUCCH) resources; and operate (1518) the first UE to cease use of the uplink resources which the additional cancellation indication DCI message indicates have been canceled.

Numbered List of Exemplary Non-Transitory Computer Readable Medium Embodiments

Non-transitory Computer Readable Medium Embodiments 1 A non-transitory computer readable medium (1812) including a first set of computer executable instructions which when executed by a processor (1802) of a user equipment (UE) (1612 or 1800) cause the UE to perform the steps of: receiving (1504) a first cancellation indication downlink control information (DCI) message indicating cancellation of at least a portion of a set of interlaced uplink resources which were previously allocated to the UE; and operating (1506) the UE to cease use of the uplink resources which the first cancellation indication DCI message indicates have been canceled.

Various embodiments are directed to apparatus, e.g., user devices such as a user equipment (UE) device, base stations (macro cell base stations and small cell base stations) such as a gNB, eNB, or ng-eNB, CBSDs, network nodes, HSS devices, relay devices, e.g. MMEs, a SAS, an AMF device, servers, customer premises equipment devices, cable systems, network nodes, gateways, cable headend/hubsites, network monitoring node/servers, cluster controllers, cloud nodes, production nodes, cloud services servers and/or network equipment devices. Various embodiments are also directed to methods, e.g., method of controlling and/or operating user devices, base stations, e.g., gNB, eNB and CBSDs, gateways, servers (HSS server), MMEs, SAS, cable networks, cloud networks, nodes, servers, cloud service servers, customer premises equipment devices, controllers, network monitoring nodes/servers and/or cable or network equipment devices. Various embodiments are directed to and well suited for communications systems and/or communications networks using unlicensed spectrum, e.g. communications systems which support Industrial Internet of Things (IIoT) communications and/or ultra-reliable low latency communications (URLLC). Various embodiments are directed to communications network which are partners, e.g. a MVNO network and a MNO network. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a MVNO base station such as a CBRS base station, e.g. a CBSD, an device such as a cellular base station e.g., a gNB, an eNB, a HSS server, a UE device, a relay device, e.g. a MME, SAS, etc., said device including a processor configured to implement one, multiple or all of the steps of one or more methods of the invention. In some embodiments, the processor or processors, e.g., CPUs, of one or more devices, e.g., communications nodes such as e.g., a MVNO base station such as a CBRS base station, e.g. a CBSD, an device such as a cellular base station e.g., a gNB, eNB, a HSS device server, a UE device, a relay device, e.g. a MME, a SAS, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., communications node such as e.g., a MVNO base station such as a CBRS base station, e.g. a CBSD, an device such as a cellular base station e.g., a gNB, eNB, a HSS server, a HSS device server, a UE device, a relay device, e.g. a MME, includes a component corresponding to each of one or more of the steps of the various described methods performed by the device in which the processor is included. In some but not all embodiments a device, e.g., as e.g., a MVNO base station such as a CBRS base station, e.g. a CBSD, an device such as a cellular base station e.g., a gNB, an eNB, a MNO HSS server, a MVNO HSS device server, a UE device, a relay device, e.g a MME, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a MNVO base station, e.g. a CBSD, a MNO cellular base station, e.g., an eNB or a gNB, a HSS server, a UE device, a SAS or other device described in the present application. In some embodiments components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a first user equipment (UE) device, the method comprising:
    receiving a first cancellation indication downlink control information (DCI) message indicating cancellation of at least a portion of a set of interlaced uplink resources which were previously allocated to the first UE device;
    operating the first UE device to cease use of the uplink resources which the first cancellation indication DCI message indicates have been canceled;
    receiving a second cancellation indication DCI message indicating cancellation of a set of SRS (Sounding Reference Signal) resources previously allocated to the first UE device, wherein the first cancellation indication DCI message includes a resource indicator value (RIV), used to communicate frequency region cancellation information, having less bits than a MV, used to communicate frequency region cancellation information, included in the second cancellation indication DCI message; and
    operating the first UE device to cease use of the uplink resources which the second cancellation indication DCI message indicates have been canceled.

2. The method of claim 1, wherein said first UE device uses unlicensed spectrum and said first cancellation indication DCI message indicates cancellation of unlicensed spectrum communications resources.

3. The method of claim 1 wherein said first cancellation indication DCI message cancels Physical Uplink Shared Channel (PUSCH) resources.

4. The method of claim 1, further comprising:
    receiving another cancellation indication DCI message indicating cancellation of a set of Physical Random Access Channel (PRACH) resources previously allocated to the first UE device; and
    operating the first UE device to cease use of the uplink resources which the another cancellation indication DCI message indicates have been canceled.

5. The method of claim 1, further comprising:
    receiving an additional cancellation indication downlink control information (DCI) message indicating cancellation of at least a portion of a set of interlaced uplink resources which were previously allocated to the first UE device, said portion of the set of interlaced uplink resources being physical uplink control channel (PUCCH) resources; and
    operating the first UE device to cease use of the uplink resources which the additional cancellation indication DCI message indicates have been canceled.

6. The method of claim 1, wherein the first cancellation indication DCI message includes 6 bits for the MV value used to communicate frequency region cancellation information.

7. The method of claim 6, wherein the second cancellation indication DCI message includes 16 bits for the RIV value used to communicate frequency region cancellation information.

8. The method of claim 1, wherein the second cancellation indication DCI message includes less bits for the field used to communicate time granularity information (GCI), than the first cancellation indication DCI message.

9. The method of claim 1, wherein the second cancellation indication DCI message includes less bits for the field used to communicate time information (TCI), than the first cancellation indication DCI message.

10. A method of operating a first user equipment (UE) device, the method comprising:
receiving a first cancellation indication downlink control information (DCI) message indicating cancellation of at least a portion of a set of interlaced uplink resources which were previously allocated to the first UE device; and
operating the first UE device to cease use of the uplink resources which the first cancellation indication DCI message indicates have been canceled;
receiving a wideband transmission cancellation indication DCI message canceling allocation of one or more resource block sets of PUSCH resources corresponding to one or more 20 MHz bands within a wideband bandwidth part (BWP), said wideband BWP being one of a 40 MHz wideband BWP, a 60 MHz wideband BWP, a 80 MHz wideband BWP or a 100 MHz wideband BWP,
wherein the wideband transmission cancellation indication DCI message includes a listen-before-talk (LBT) bandwidth PUSCH indicator indicating which ones of the one or more 20 MHz bands in the wideband PUSCH resources allocated to the first UE device are being canceled; and
wherein the LBT bandwidth PUSCH indicator includes 2 to 5 bits, said number of bits being a function of the width of the wideband PUSCH resource allocated to the first UE device.

11. A method of operating a first user equipment (UE) device, the method comprising:
receiving a first cancellation indication downlink control information (DCI) message indicating cancellation of at least a portion of a set of interlaced uplink resources which were previously allocated to the first UE device; and
operating the first UE device to cease use of the uplink resources which the first cancellation indication DCI message indicates have been canceled;
wherein the first UE device has been scheduled or configured to use a multi-slot PUSCH transmission over multiple consecutive transmission slots; and
wherein the method further comprises:
receiving, at the first UE device, a cancellation indication indicating cancellation of transmission in a first PUSCH slot in said multiple consecutive transmission slots; and
wherein the first UE device changes a category of an LBT to be performed prior to transmission in a second PUSCH slot of said multiple consecutive transmission slots based on the cancellation of the transmission in the first PUSCH slot.

12. A first user equipment (UE) comprising:
a wireless receiver; and
a processor configured to:
operate the wireless receiver to: receive a first cancellation indication downlink control information (DCI) message indicating cancellation of at least a portion of a set of interlaced uplink resources which were previously allocated to the first UE;
operate the first UE to cease use of the uplink resources which the first cancellation indication DCI message indicates have been canceled;
operate the first receiver to receive a second cancellation indication DCI message indicating cancellation of a set of SRS (Sounding Reference Signal) resources previously allocated to the first UE, wherein the first cancellation indication DCI message includes a resource indicator value (RIV), used to communicate frequency region cancellation information, having less bits than a RIV, used to communicate frequency region cancellation information, included in the second cancellation indication DCI message; and
operate the first UE to cease use of the uplink resources which the second cancellation indication DCI message indicates have been canceled.

13. The first UE of claim 12, wherein said first UE uses unlicensed spectrum and said first cancellation indication DCI message indicates cancellation of unlicensed spectrum communications resources.

14. The first UE of claim 12 wherein said first cancellation indication DCI message cancels Physical Uplink Shared Channel (PUSCH) resources.

15. The first UE of claim 12, wherein said processor is further configured to:
operate the wireless receiver to receive another cancellation indication DCI message indicating cancellation of a set of Physical Random Access Channel (PRACH) resources previously allocated to the first UE; and
operate the first UE to cease use of the uplink resources which the another cancellation indication DCI message indicates have been canceled.

16. The first UE of claim 12, wherein said processor is further configured to:
operate the wireless receiver to receive a wideband transmission cancellation indication DCI message canceling allocation of one or more resource block sets of PUSCH resources corresponding to one or more 20 MHz bands within a wideband bandwidth part (BWP), said wideband BWP being one of a 40 MHz wideband BWP, a 60 MHz wideband BWP, a 80 MHz wideband BWP or 100 MHz wideband BWP.

17. The first UE of claim 12, wherein the first cancellation indication DCI message includes 6 bits for the RIV value used to communicate frequency region cancellation information.

18. The first UE of claim 12, wherein the second cancellation indication DCI message includes 16 bits for the RIV value used to communicate frequency region cancellation information.

19. The first UE of claim 12, wherein the second cancellation indication DCI message includes less bits for the field used to communicate time granularity information (GCI), than the first cancellation indication DCI message.

20. A non-transitory computer readable medium including a first set of computer executable instructions which when executed by a processor of a user equipment (UE) cause the UE to perform the steps of:
receiving a first cancellation indication downlink control information (DCI) message indicating cancellation of at least a portion of a set of interlaced uplink resources which were previously allocated to the UE;
operating the UE to cease use of the uplink resources which the first cancellation indication DCI message indicates have been canceled;
receiving a second cancellation indication DCI message indicating cancellation of a set of SRS (Sounding Reference Signal) resources previously allocated to the UE, wherein the first cancellation indication DCI message includes a resource indicator value (RIV), used to communicate frequency region cancellation information, having less bits than a RIV, used to communicate frequency region cancellation information, included in the second cancellation indication DCI message; and operating the UE to cease use of the uplink resources which the second cancellation indication DCI message indicates have been canceled.

\* \* \* \* \*